United States Patent
Aldrey et al.

(10) Patent No.: US 8,719,891 B1
(45) Date of Patent: May 6, 2014

(54) METHODS AND SYSTEMS FOR PROVIDING PROMOTIONAL CONTENT BASED ON A MIGRATION OF A USER ACCOUNT FROM A FIRST DIGITAL VIDEO RECORDING ("DVR") SYSTEM TO A SECOND DVR SYSTEM

(71) Applicant: Verizon Patent and Licensing Inc., Arlington, VA (US)

(72) Inventors: Rual I. Aldrey, Plano, TX (US); Donald H. Relyea, Dallas, TX (US); Venkata S. Adimatyam, Irving, TX (US); Kishore Tallapaneni, Flower Mound, TX (US); Michael R. Oliver, Hoboken, NJ (US); George M. Higa, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/731,955

(22) Filed: Dec. 31, 2012

(51) Int. Cl.
 *G06F 3/00* (2006.01)
 *G06F 13/00* (2006.01)
 *H04N 5/445* (2011.01)
 *H04N 7/173* (2011.01)

(52) U.S. Cl.
 USPC .............. 725/132; 725/37; 725/105; 725/131

(58) Field of Classification Search
 USPC ........... 725/37, 105, 109, 114, 115, 116, 131, 725/132, 134
 See application file for complete search history.

(56) References Cited

U.S. PATENT DOCUMENTS

| | | | |
|---|---|---|---|
| 8,275,245 B2 * | 9/2012 | Amsterdam et al. | 386/294 |
| 2004/0261114 A1 * | 12/2004 | Addington et al. | 725/106 |
| 2008/0172696 A1 * | 7/2008 | Furusawa et al. | 725/46 |
| 2009/0044233 A1 * | 2/2009 | Brandt et al. | 725/87 |
| 2009/0254966 A1 * | 10/2009 | Josephs et al. | 725/140 |
| 2012/0204215 A1 * | 8/2012 | Hayashi et al. | 725/88 |
| 2012/0284749 A1 * | 11/2012 | Lee et al. | 725/39 |

\* cited by examiner

*Primary Examiner* — John Schnurr

(57) ABSTRACT

An exemplary method includes a promotion system 1) detecting a promotion opportunity based on a condition associated with a migration of a user account from being associated with a first digital video recording ("DVR") system to being associated with a second DVR system and 2) providing, based on the detected promotion opportunity, promotional content for access by a user associated with the user account. Corresponding methods and systems are also disclosed.

22 Claims, 20 Drawing Sheets

METHODS AND SYSTEMS FOR PROVIDING PROMOTIONAL CONTENT BASED ON A MIGRATION OF A USER ACCOUNT FROM A FIRST DIGITAL VIDEO RECORDING ("DVR") SYSTEM TO A SECOND DVR SYSTEM

BACKGROUND INFORMATION

Digital video recording ("DVR") systems allow users to record media content assets (e.g., television programs, etc.) and then view or otherwise experience the recorded media content assets. For example, a user may use a DVR system to schedule a recording of a particular television program, after which the DVR system may record the television program and allow the user to play back the recorded television program in a time-shifted manner.

Over time, a DVR system may record and store (e.g., within a hard drive) an extensive library of media content assets. The DVR system may also store DVR data associated with the library of media content assets and/or the DVR system. The DVR data may include metadata descriptive of the media content assets, data representative of settings (e.g., recording instructions provided by the user, recording conflict resolution rules, etc.) of the DVR system, and/or data representative of business logic used by the DVR system to implement the various recording instructions provided by the user and/or any other operation performed by the DVR system.

Unfortunately, if the user desires to upgrade or otherwise switch to a new DVR system, the user typically has to program the new DVR system from scratch. For example, the user may have to provide a whole new set of recording instructions to the new DVR system and interact extensively with the new DVR system for the new DVR system to "learn" (i.e., develop the appropriate business logic) the tendencies and/or preferences of the user. This process can be tedious, time consuming, and daunting for the user, especially if the new DVR system has a different interface than the previous DVR system.

Moreover, it may be difficult or even impossible for the user to rebuild the library of media content assets that he or she had recorded on the previous DVR system. For example, the user may have to manually identify each media content asset that had been recorded and then manually determine how to acquire each media content asset (e.g., by searching within an electronic program guide for a rebroadcast of a particular media content asset and then directing the new DVR system to record the media content asset when it is rebroadcast). In addition to being tedious and time consuming for the user, this process may be futile for some media content assets if they are not scheduled to for rebroadcast.

In addition, a user manually reprogramming a new DVR system from scratch and/or manually determining how to reacquire each media content asset traditionally provides little or no benefit to the user, a service provider (e.g., a DVR service provider), or a media content provider.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
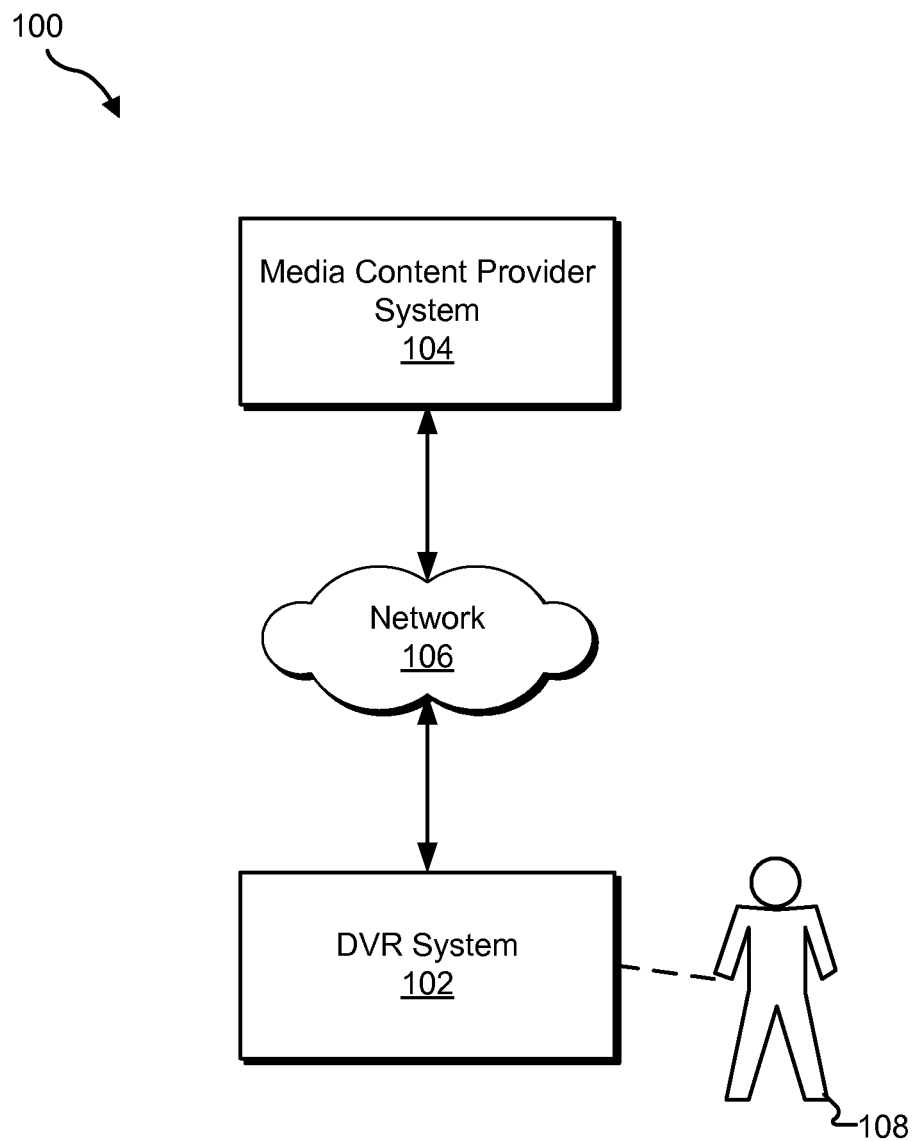
FIG. 1 illustrates an exemplary configuration in which a DVR system is communicatively coupled to a media content provider system according to principles described herein.

Methods and systems for providing promotional content based on a migration of a user account from a first DVR system to a second DVR system are described herein. In some examples, the methods and systems described herein may be configured to provide promotional content to a user associated with the user account based on one or more conditions associated with the migration of the user account from the first DVR system to the second DVR system. For example, as will be described below, a promotion system may 1) detect a promotion opportunity based on a condition associated with a migration of a user account from being associated with a first DVR system to being associated with a second DVR system and 2) provide, based on the detected promotion opportunity, promotional content for access by a user associated with the user account.

As used herein, "promotional content" may refer to any content that may be presented to a user to promote a product, service, or feature thereof and/or to promote access to the product, service, or feature thereof. For example, promotional content may include data representative of a promotion and configured to be processed by a computing device that presents the promotion to a user of the computing device. As another example, promotional content may include user selectable options configured to be selected to facilitate access by the user to a product, service, or feature thereof. Examples of promotional content may include, without limitation, data representative of advertisements, up-selling and/or upgrading opportunities, media content asset recommendations, and options selectable by users to access a product, service, or feature thereof associated with the advertisements, opportunities, and/or recommendations. In certain examples, promotional content may promote media content assets, access to media content assets, and/or media content access services (e.g., media subscription packages). These and other examples of promotional content are described in more detail herein.

As used herein, a "media content asset" may refer to any media content program, television program, on-demand media program, pay-per-view media program, broadcast media program (e.g., broadcast television program), multicast media program (e.g., multicast television program), narrowcast media program (e.g., narrowcast video-on-demand program), IPTV media content, advertisement, video, movie, audio program, radio program, or any segment, component, or combination of these or other forms of media content that a user may access by way of a DVR system.

Various benefits may be realized in accordance with the methods and systems described herein. For example, the methods and systems described herein may allow a user to migrate from using a first DVR system to using a second DVR system without having to manually program the second DVR system to operate like the first DVR system, without losing access to a library of media content assets stored by the first DVR system, and/or without having to manually rebuild the library of media content assets over time. Moreover, the methods and systems described herein may allow a provider of products and/or services to promote products, services, and/or features thereof to a user in a targeted and/or relevant manner based on one or more conditions associated with the migration. The promotions may help the user to learn and take advantage of opportunities to improve or upgrade a library of media content assets and/or opportunities to access to media content assets based on one or more conditions associated with the migration.

FIG. 1 illustrates an exemplary configuration 100 in which a DVR system 102 is communicatively coupled to a media content provider system 104. As will be described below, various components of an exemplary DVR migration system and/or an exemplary promotion system described herein may be implemented by DVR system 102 and/or media content provider system 104.

DVR system 102 and media content provider system 104 may communicate with one another using any suitable communication technologies, devices, media, and protocols supportive of data communications, including, but not limited to, socket connections, Ethernet, data bus technologies, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

DVR system 102 and media content provider system 104 may communicate using any suitable network. For example, as shown in FIG. 1, DVR system 102 and media content provider system 104 may be configured to communicate with each other by way of network 106. Network 106 may include one or more networks or types of networks capable of carrying communications and/or data signals between DVR system 102 and media content provider system 104. For example, network 106 may include, but is not limited to, a cable network, an optical fiber network, a hybrid fiber coax network, a wireless network (e.g., a Wi-Fi and/or mobile telephone network), a satellite network, a wireless broadcast network (e.g., a satellite media broadcasting network or terrestrial broadcasting network), a subscriber television network, a provider-specific network, the Internet, an intranet, a local area network, any other suitable network, and/or any combination or sub-combination of these networks.

Media content provider system 104 may be associated with a service provider (e.g., a subscriber television service provider, an Internet service provider, a DVR service provider, etc.), a media content asset provider (e.g., ESPN, NBC, etc.), and/or any other type of media content provider. Accordingly, media content provider system 104 may be configured to provide one or more media content services (e.g., DVR services, television services, video-on-demand services, Internet services, electronic program guide services, etc.) to DVR system 102 and/or to users by way of DVR system 102. For example, media content provider system 104 may be configured to manage (e.g., maintain, process, distribute, and/or generate) media content assets and/or electronic program guide data configured to be delivered to DVR system 102. Media content provider system 104 may be implemented by one or more computing devices (e.g., one or more servers associated with one or more entities) as may serve a particular implementation.

DVR system 102 may facilitate access by one or more users to media content (e.g., media content assets) provided by media content provider system 104. For example, DVR system 102 may present and/or record media content assets at the direction of one or more users. To this end, DVR system 102 may include one or more tuners. Each tuner may be configured to be tuned to a particular media content asset at the direction of DVR system 102 and/or at the direction of a user of DVR system 102. This may be performed in any suitable manner. For example, a tuner may tune to a media content asset by tuning to a media content channel carrying the media content asset. Additionally or alternatively, a tuner may tune (e.g., switch) to a digital stream of data packets (e.g., Internet Protocol ("IP") based data packets) carrying the media content asset. A "tuner" may be implemented by one or more hardware components and/or one or more software components.

In some examples, DVR system 102 may be associated with a user account maintained by and/or otherwise corresponding to one or more users (e.g., user 108 shown in FIG. 1). For example, the user may associate his or her user account with DVR system 102 by subscribing to a DVR service provided by way of DVR system 102 (e.g., by purchasing a subscription package from a subscriber television service provider), registering the user account with DVR system 102 (e.g., by logging in to DVR system 102), and/or in any other manner.

A user account associated with DVR system 102 may be associated with a library of media content assets stored by DVR system 102, such as a library of media content assets that have been recorded over time by DVR system 102.

The user account associated with DVR system 102 may also be associated with a DVR data set maintained by DVR system 102. As used herein, the terms "DVR data" and "DVR data set" may refer to any data associated with (e.g., maintained and/or used by) a DVR system. In some examples, the DVR data may be separate from data representative of a library of media content assets stored by the DVR system (i.e., the DVR data may be separate from one or more data files representative of each media content asset included in the library of media content assets). For example, a DVR data set associated with DVR system 102 that a user has used over a period of time to acquire (e.g., record) a library of media content assets may include metadata descriptive of one or more characteristics of the media content assets, data representative of settings of the DVR system (e.g., recording instructions provided by the user to acquire the media content assets, recording conflict resolution rules, etc.), and/or data representative of business logic used by the DVR system to implement the various recording instructions provided by the user and/or any other operation performed by the DVR system.

In some examples, DVR system 102 may be provided and/or otherwise managed by a media content provider and/or a service provider associated with media content provider system 104. For example, DVR system 102 may be provided by a particular subscriber television service provider. As will be described below, a user may in some instances desire to switch subscriber television service providers, which may necessitate a corresponding switch in the particular DVR system to which the user is associated.

DVR system 102 may be implemented by any suitable combination of media content processing or computing devices ("processing devices"). For example, DVR system 102 may be implemented by one or more local processing devices each associated with the same user account (i.e., processing devices that the user interacts with directly such as set-top box devices, DVR devices, receivers, personal computers, mobile devices (e.g., mobile phones and/or tablet computers), personal-digital assistant devices, gaming devices, television devices, etc.). Each processing device may include a storage device configured to store data associated with the processing device and one or more processors configured to perform the operations described herein.

Figure 2:
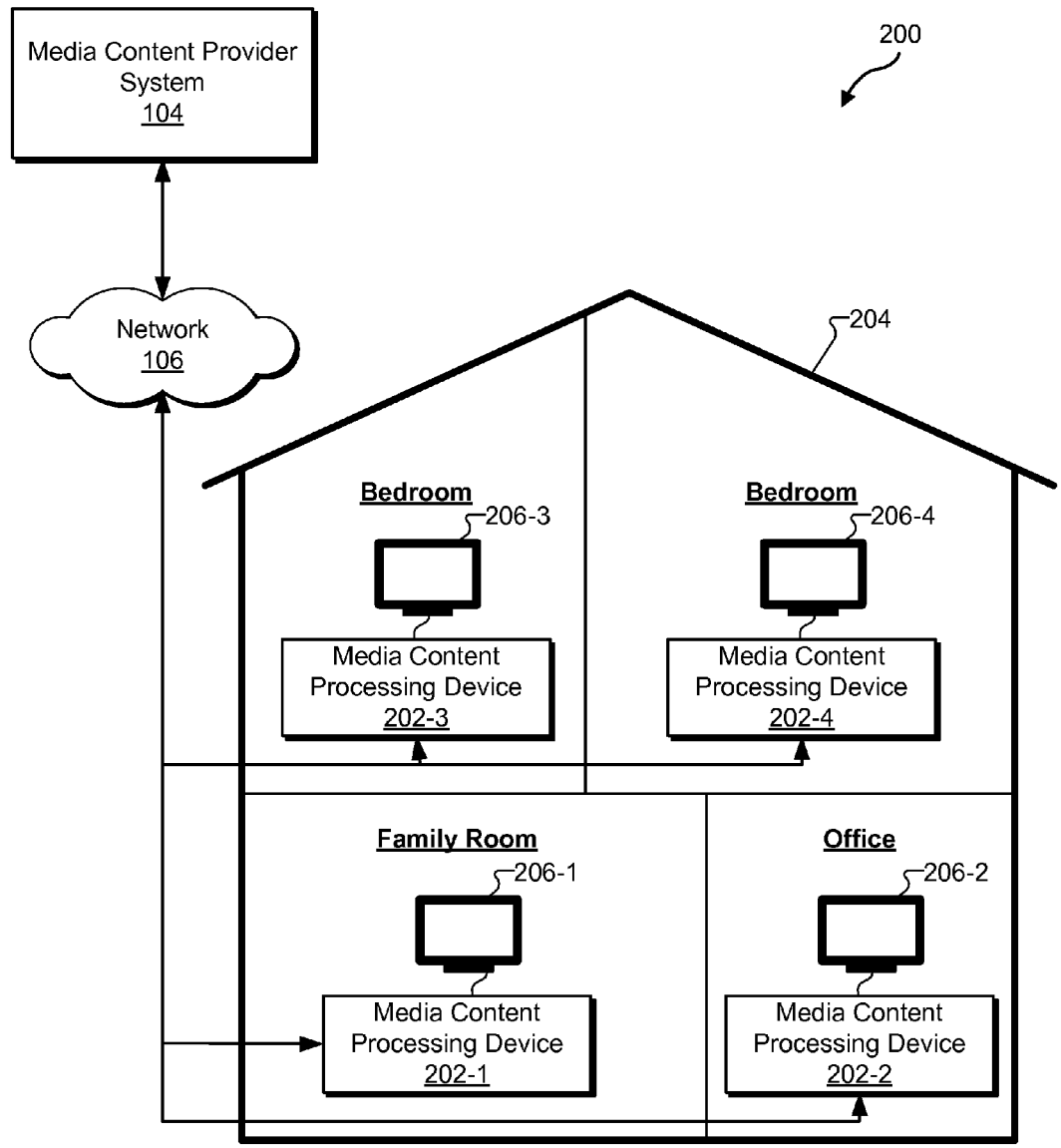
FIG. 2 shows an exemplary implementation of a DVR system according to principles described herein.

To illustrate, FIG. 2 shows an exemplary implementation 200 of DVR system 102 in which DVR system 102 is implemented by a plurality of media content processing devices 202 (e.g., media content processing devices 202-1 through 202-4) located within a particular premises 204 (e.g., a home). Each media content processing device 202 may be implemented by one or more of the local processing devices described herein. For example, each media content processing device may be implemented by a set-top box device having DVR capabilities.

As shown, media content processing device 202 may be distributed throughout premises 204. For example, FIG. 2 shows that media content processing devices 202 are distributed throughout various rooms of premises 204. In this manner, users located within premises 204 may experience and/or otherwise interact with media content at various locations throughout premises 204.

Media content processing devices 202 may each be associated with (e.g., connected to) a display 206 (e.g., displays 206-1 through 206-4). Displays 206 may include any suitable display device separate from media content processing devices 202 (e.g., televisions, computer monitors, etc.) and/or any suitable display device integrated into media content processing devices 202 (e.g., display screens). Media content processing devices 202 may be configured to present media content by way of displays 206.

As shown, each media content processing device 202 may be communicatively coupled to media content provider system 104 by way of network 106. This may be realized in any suitable manner, such as directly or by way of one or more intermediary devices such as a gateway device at premises 204.

Figure 3:
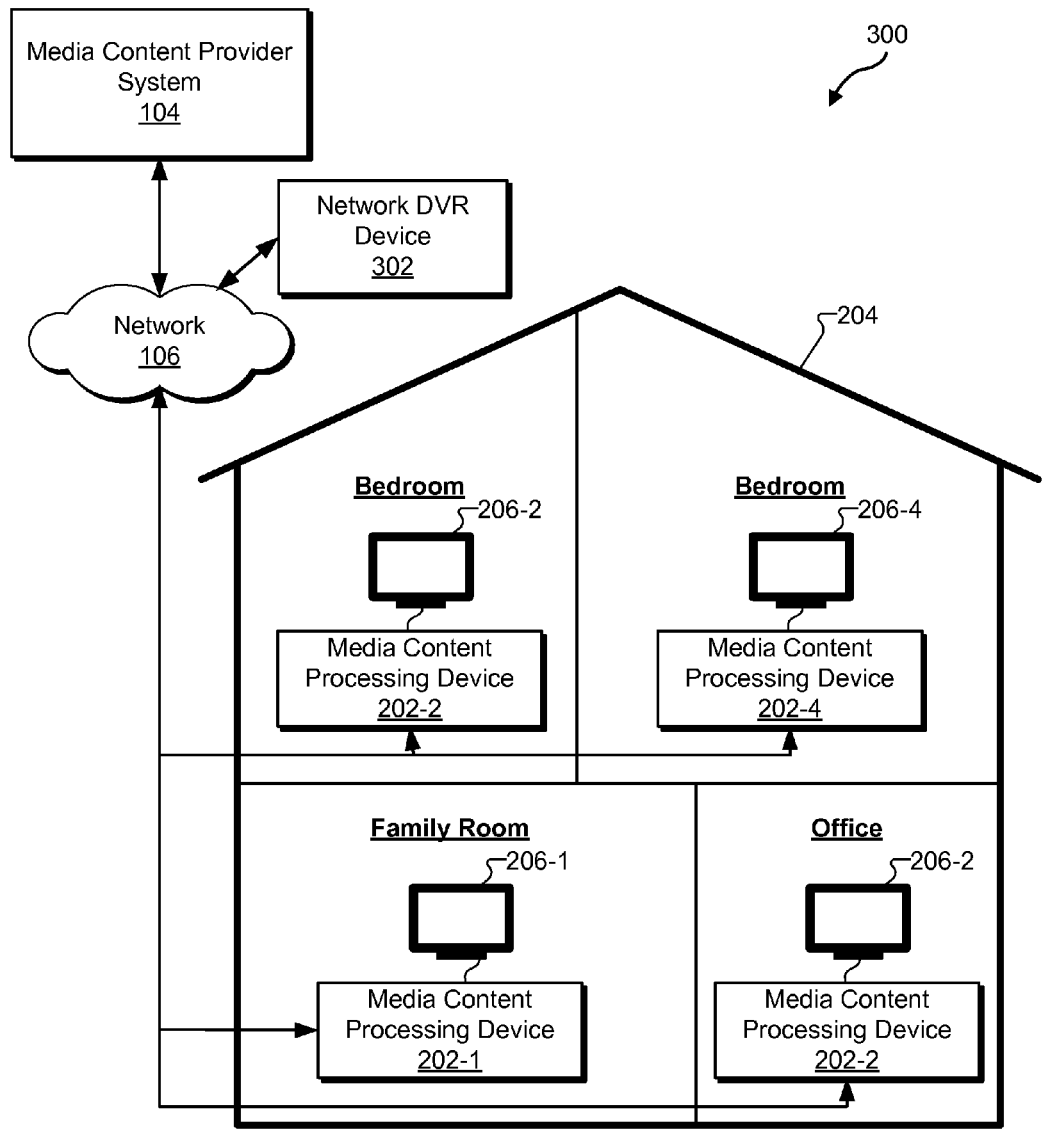
FIG. 3 shows another exemplary implementation of a DVR system according to principles described herein.

DVR system 104 may additionally or alternatively be implemented by one or more remote processing devices. For example, FIG. 3 shows another exemplary implementation 300 of DVR system 102 in which DVR system 102 is at least partially implemented by a network DVR device 302. Network DVR device 302 may be implemented by one or more computing devices (e.g., one or more servers) configured to provide DVR services.

As shown, network DVR device 302 may be remote from premises 204 and may be configured to communicate with media content processing devices 202 and media content provider system 104 by way of network 106. In this implementation, network DVR device 302 may perform one or more DVR operations traditionally performed by local DVR devices. For example, network DVR device 302 may record and/or store media content assets, stream media content assets to media content processing devices 202, and/or perform any other DVR operation as may serve a particular implementation. Each media content processing device 202 may be configured to interface with network DVR device 302 such that one or more users located within premises 204 may direct network DVR device 302 to perform one or more DVR operations.

In some examples, network DVR device 302 may be associated with and/or maintained by a media content provider and/or a service provider associated with media content provider system 104. For example, network DVR device 302 may be located at a premises maintained by a subscriber television service provider.

Figure 4:
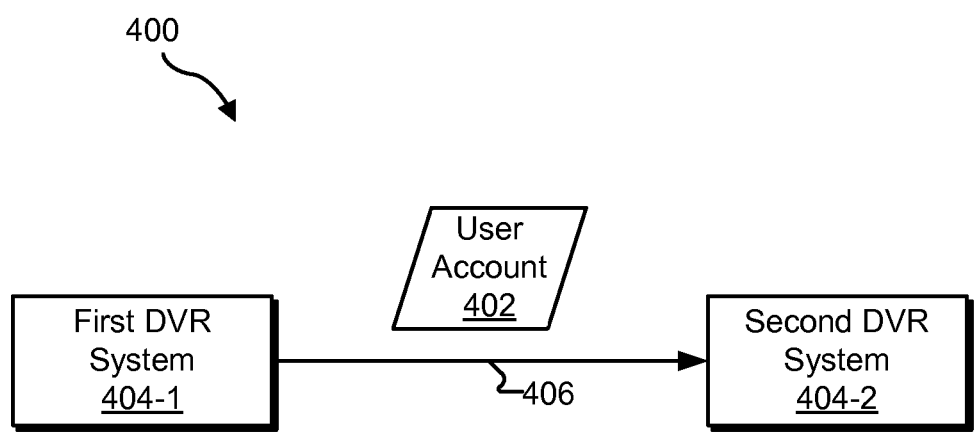
FIG. 4 illustrates an exemplary scenario in which a user account is migrated from being associated with a first DVR system to being associated with a second DVR system according to principles described herein.

FIG. 4 illustrates an exemplary scenario 400 in which a user account 402 is migrated from being associated with a first DVR system 404-1 to being associated with a second DVR system 404-2. The migration is represented in FIG. 4 by arrow 406. First and second DVR systems 404-1 and 404-2 (collectively "DVR systems 404") may be similar to DVR system 102 and may be implemented in any of the ways described herein.

Various situations may arise in which it is desirable for user account 402 to be migrated from being associated with first DVR system 404-1 to being associated with second DVR system 404-2, as shown in FIG. 4. For example, a user associated with user account 402 may desire to upgrade from using first DVR system 404-1 (e.g., a legacy DVR system with limited storage capacity and/or other limited features) to using second DVR system 404-2 (e.g., a new DVR system with relatively more storage capacity and/or relatively enhanced features).

Additionally or alternatively, the user may desire to consolidate the number of processing devices that he or she uses. For example, the user may desire to switch from using multiple set-top box devices (e.g., multiple set-top box devices that implement first DVR system 404-1) each with a relatively small storage capacity to using a single set-top box device (e.g., a single set-top box device that implements second DVR system 404-2) that has a relatively large storage capacity.

Additionally or alternatively, the user may desire to switch from a first DVR service provider (e.g., a first subscriber television service provider) associated with (e.g., that provides) first DVR system 404-1 to a second DVR service provider (e.g., a second subscriber television service provider) associated with (e.g., that provides) second DVR system 404-2.

In each of these cases, it may be desirable for the second DVR system 404-2 to replicate a library of media content assets stored by the first DVR system 404-1. However, as described above, it may be difficult or impossible to acquire (e.g., transfer) the library of media content assets directly from the first DVR system 404-1 to the second DVR system 404-2.

Additionally or alternatively, it may be desirable in each of these cases for the second DVR system 404-2 to operate in accordance with the DVR data set associated with the library of media content assets and maintained by the first DVR system 404-1. However, as described above, it may be difficult and/or impossible to acquire (e.g., transfer) the DVR data set directly from the first DVR system 404-1 to the second DVR system 404-2.

Figure 5:
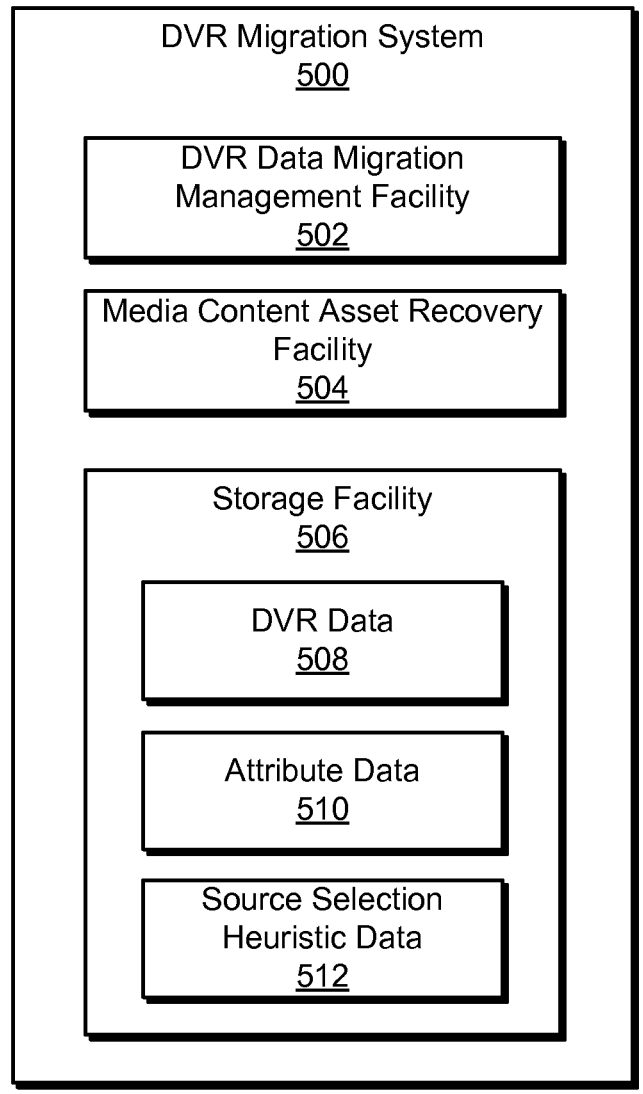
FIG. 5 illustrates an exemplary DVR migration system according to principles described herein.

To this end, FIG. 5 illustrates an exemplary DVR migration system 500 ("system 500") configured to facilitate a migration of a user account from being associated with a first DVR system (e.g., first DVR system 404-1) to being associated with a second DVR system (e.g., second DVR system 404-2). As shown, system 500 may include, without limitation, a DVR data migration management facility 502 ("data migration facility 502"), a media content asset recovery facility 504 ("recovery facility 504"), and a storage facility 506 selectively and communicatively coupled to one another. It will be recognized that although facilities 502-506 are shown to be separate facilities in FIG. 5, any of facilities 502-506 may be combined into fewer facilities, such as into a single facility, or divided into more facilities as may serve a particular implementation.

System 500 may be implemented by any suitable combination of computing devices and/or systems. For example, facilities 502-506 of system 500 may be implemented entirely by media content provider system 104, by a server not associated with media content provider system 104, by a DVR system (e.g., second DVR system 404-2), and/or by any other device and/or system. Alternatively, facilities 502-506 of system 500 may be distributed across any combination of these systems and/or devices.

Data migration facility 502 may be configured to receive a request for a user account to migrate from being associated with a first DVR system to being associated with a second DVR system. This may be performed in any suitable manner. For example, data migration facility 502 may receive a request for the user account to upgrade or otherwise switch from the first DVR system to the second DVR system. As another example, data migration facility 502 may receive the request by detecting a registration of the user account with the second DVR system.

Data migration facility 502 may be configured to perform one or more DVR data migration operations. For example, in response to a request for a user account to migrate from being associated with a first DVR system to being associated with a second DVR system (a "migration request"), data migration facility 502 may access a first DVR data set associated with the first DVR system. In some alternative examples, data migration facility 502 may access the first DVR data set, at least partially, prior to the migration request. As described above, the DVR data set may be separate from data representative of a library of media content assets stored by the DVR system.

Data migration facility 502 may access the first DVR data set associated with the first DVR system in any suitable manner. For example, in some cases, the first DVR data set is stored by the first DVR system. In these cases, data migration facility 502 may access the first DVR data set by directing the first DVR system to upload the first DVR data set to system 500. Alternatively, data migration facility 502 may access the first DVR data set by accessing the first DVR data set directly from the first DVR system (e.g., by analyzing the first DVR data set stored by the first DVR system without requiring the first DVR system to first upload the first DVR data set to system 500).

Data migration facility 502 may additionally or alternatively access at least a portion of the first DVR data set from a computing system other than the first DVR system. For example, a media content provider, an electronic program guide provider, and/or any other entity may maintain at least a portion of the first DVR data set on a server or the like that is remote from the first DVR system. In this case, data migration facility 502 may acquire at least a portion of the first DVR data set from one or more of these sources.

Data migration facility 502 may be further configured to generate a second DVR data set based on the first DVR data set and in accordance with one or more attributes of the second DVR system. The second DVR data set may be generated in any suitable manner. For example, the second DVR data set may be generated by modifying the first DVR data set in accordance with the one or more attributes of the second DVR system.

Figure 6:
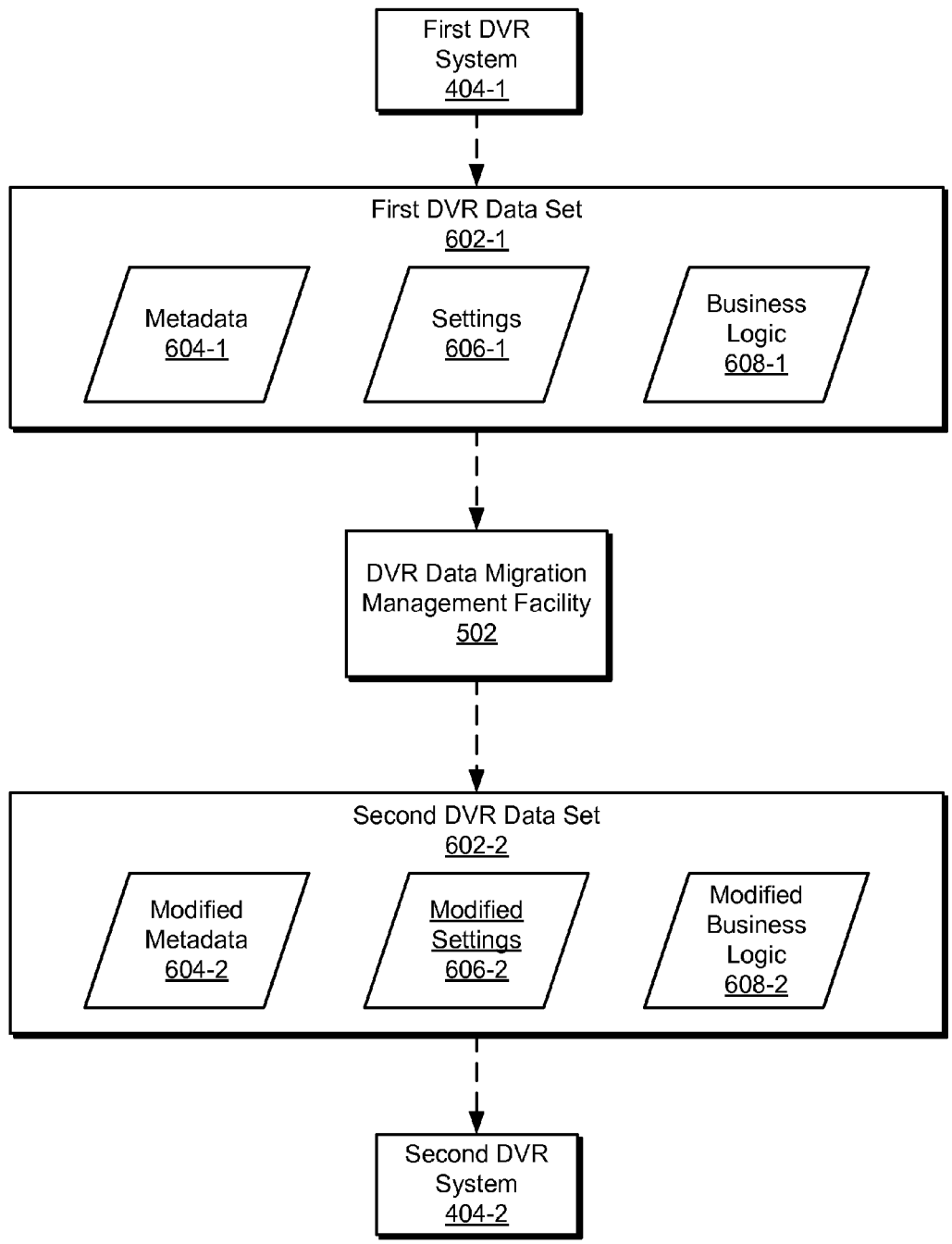
FIG. 6 illustrates an exemplary generation of a second DVR data set based on a first DVR data set according to principles described herein.

To illustrate, FIG. 6 shows an exemplary generation of a second DVR data set 602-2 based on a first DVR data set 602-1 that may be performed by data migration facility 502. As shown, first DVR data set 602-1 may include metadata 604-1, settings data 606-1, and business logic data 608-1 associated with one or more operations performed by the first DVR system (e.g., DVR system 404-1). It will be recognized that first DVR data set 602-1 may include only one or more of these types of data and/or any other type of data as may serve a particular implementation. Metadata 604-1, settings data 606-1, and business logic data 608-1 will now be described in more detail.

Metadata 604-1 may include any data descriptive of one or more attributes of the media content assets included in the library of media content assets stored by the first DVR system. For example, metadata 604-1 may include, but is not limited to, time data, physical location data, user data, source data, destination data, size data, creation data, modification data, access data (e.g., play counts), and/or any other data descriptive of the media content assets. For example, metadata associated with a television program may include a title of the television program, a name of one or more people associated with the television program (e.g., actors, directors, producers, creators, etc.), a rating of the television program (e.g., user ratings, critic ratings, etc.), a synopsis of the television program, a setting of the television program, a theme of the television program, a format of the television program, a quality (e.g., resolution) of the television program, a size of the television program, a time or date associated with the television program (e.g., time or date of production, time or date of release, etc.), a color content of the television program, a bit rate of the television program, a compression amount of the television program, a codec associated with the television program, and/or any other information corresponding to the television program as may serve a particular application. Metadata corresponding to other types of media content assets may include additional or alternative information.

Settings data 606-1 may be representative of one or more settings of the first DVR system. Settings data 606-1 may be generated in response to user input. For example, settings data 606-1 may be representative of one or more recording instructions provided by the user and/or one or more recording conflict resolution rules specified by the user. To illustrate, settings data 606-1 may specify that the first DVR system is to record each episode of a television series scheduled to be broadcast over a period of time. Settings data 606-1 may additionally or alternatively be generated automatically by the first DVR system. For example, settings data 606-1 may be representative of one or more manners in which one or more options are presented to a user within an interface.

Business logic data 608-1 may be representative of business logic used by the first DVR system to implement the various operations performed by the first DVR system. For example, business logic data 608-1 may be representative of a manner in which the first DVR system handles the various recording requests provided by the user. To illustrate, business logic data 608-1 may specify a manner in which a recording conflict is handled by the first DVR system when the user provides a request to record a particular media content asset.

Business logic data 608-1 may be dynamically generated over time as the user interacts with the first DVR system. In this manner, the first DVR system may "learn" one or more tendencies and/or preferences of the user. For example, the first DVR system may recognize that the user likes to watch a particular genre of media content assets based on a viewing history of the user. The first DVR system may accordingly update its business logic data 608-1 and, based on this data, automatically recommend one or more media content assets in the same genre to the user.

In some examples, data migration facility 502 may generate second DVR data set 602-2 by modifying the data included in first DVR data set 602-1 in accordance with one or more attributes of the second DVR system. For example, as illustrated in FIG. 6, second DVR data set 602-2 may include modified metadata 604-2, modified settings data 606-2, and modified business logic data 608-2. Modified metadata 604-2 may include a modified version of metadata 604-1 that takes into account the one or more attributes of the second DVR system. Likewise, modified settings data 606-2 may include a modified version of settings data 606-1 that takes into account the one or more attributes of the second DVR system, and modified business logic data 608-2 may include a modified version of business logic data 608-1 that takes into account the one or more attributes of the second DVR system. Various examples of modifying each of these types of data in accordance with one or more attributes of the second DVR system will now be described.

In some examples, data migration facility 502 may modify metadata 604-1 in accordance with one or more attributes of the second DVR system by updating metadata 604-1 to include one or more values specific to the second DVR system. For example, the user may have directed the first DVR system to record a standard definition ("SD") version of a particular media content asset in order to minimize the amount of storage space required to store the media content asset. Hence, the media content asset may have a metadata value representative of "SD." However, the second DVR system may have a relatively larger storage capacity than the first DVR system. Based on this, data migration facility 502 may update the metadata value that defines the resolution of the media content asset to be equal to high definition ("HD"). The updated metadata value may be included in modified metadata 604-2 of second DVR data set 602-2. Using this updated metadata value, the second DVR system may automatically acquire an HD version of the media content asset for inclusion within its library of media content assets instead of an SD version of the media content asset.

Data migration facility 502 may additionally or alternatively modify settings data 606-1 in accordance with one or more attributes of the second DVR system in any suitable manner. For example, a particular setting represented by settings data 606-1 may specify that the first DVR system is to record an SD version of each episode of a television series scheduled to be broadcast over a period of time. However, if the second DVR system has a relatively higher storage capacity than the first DVR system, data migration facility 502 may modify the setting for inclusion in settings data 606-2 to specify that the second DVR system is to record an HD version of each of the episodes.

Data migration facility 502 may additionally or alternatively modify business logic data 608-1 in accordance with one or more attributes of the second DVR system in any suitable manner. For example, business logic represented by business logic data 608-1 may specify a manner in which a recording conflict is handled by the first DVR system when the user provides a request to record a particular media content asset. To illustrate, the first DVR system may have only two tuners. Business logic maintained by the first DVR system may specify a manner in which the user desires the first DVR system to handle recording conflicts that arise when both tuners are in use and the first DVR system receives an instruction to record another media content asset. However, the second DVR system may have more than two tuners. Hence, data migration facility 502 may modify the business logic for inclusion in business logic data 608-2 to account for the additional tuners.

It will be recognized that in some alternative examples, one or more types of data included in first DVR data set 602-1 may not be modified by data migration facility 502 during the generation of second DVR data set 602-2. For example, data migration facility 502 may determine that the same metadata, settings data, and/or business logic data included in first DVR data set 602-1 should be included in second DVR data set 602-2. To illustrate, data migration facility 502 may determine that it is unnecessary to modify the metadata included in first DVR data set 602-2. In these cases, data migration facility 502 may generate second DVR data set 602-2 by copying or otherwise replicating the metadata, settings data, and/or business logic data included in first DVR data set 602-1. Additionally or alternatively, data migration facility 502 may generate completely new metadata, settings data, and/or business logic data for inclusion in second DVR data set 602-2.

In some examples, data migration facility 502 may at least in part base the generation of the second DVR data set (e.g., second DVR data set 602-2) on input (i.e., feedback) provided by the user. For example, data migration facility 502 may provide one or more options associated with the generation of the second DVR data set for presentation within a GUI, detect a selection by a user of an option included in the one or more options presented within the GUI, and generate the second DVR data set in accordance with the option selected by the user.

After the second DVR data set is generated, data migration facility 502 may associate the second DVR data set with the second DVR system (e.g., with DVR system 404-2 as illustrated in FIG. 6). This may be performed in any suitable manner. For example, data migration facility 502 may associate the second DVR data set with the second DVR system by transmitting the second DVR data set to the second DVR system for use by the second DVR system.

Additionally or alternatively, data migration facility 502 may associate the second DVR data set with the second DVR system by designating the second DVR data set for use by the DVR system. In this manner, the second DVR data set does not necessarily have to be transmitted to the second DVR system. Instead, system 500 and/or any other computing device separate from the second DVR system (e.g., a server maintained by a subscriber television service provider) may maintain the second DVR data set and use the second DVR data set to control one or more operations of the second DVR system.

After the second DVR data set is associated with the second DVR system, the second DVR system may perform one or more operations in accordance with the second DVR data set. This may minimize or eliminate the need for the user to extensively program the second DVR system as the user begins to use the second DVR system.

The association of the second DVR data set with the second DVR system may complete a migration of a DVR data set from a first DVR system to a second DVR system. Such a DVR data set migration, which may also be referred to as a "porting" of a DVR data set, may be a component of a migration of a user account from the first DVR system to the second DVR system.

In certain examples, after the second data set is associated with the second DVR system to complete a porting of the DVR data set from the first DVR system to the second DVR system, a media content asset recovery component of the migration of the user account from the first DVR system to the second DVR system may be performed by recovery facility 504 of system 500. Recovery facility 504 may perform recovery operations to attempt to rebuild, within the second DVR system, the library of media content assets stored by the first DVR system at a time associated with the migration request.

For example, recovery facility 504 may identify and direct the second DVR system to acquire at least one media content asset included in the library of media content assets stored by the first DVR system (as the library existed at a time associated with the data set migration such as the time of the migration request) from a media content source in accordance with the second DVR data set. For example, recovery facility 504 may use metadata included in the second DVR data set to identify a media content asset included in the library of media content assets, select a media content source configured to distribute the media content asset, and direct the second DVR system to acquire (e.g., download or record) the media content asset from the selected media content source.

In some examples, the media content source from which recovery facility 504 acquires the media content asset may be different than the first DVR system. Acquiring a media content asset from a media content source other than the first DVR system as opposed to acquiring the media content source from the first DVR system directly (e.g., by migrating data representative of the media content asset) may be necessary and/or preferred such as in cases where the media content asset stored by the first DVR system is protected (e.g., encrypted) using one or more DRM heuristics.

Recovery facility 504 may direct the second DVR system to acquire a media content asset from a media content source in any suitable way. As an example, recovery facility 504 may be at least partially implemented by the second DVR system, in which case recovery facility 504 may direct any other components of the second DVR system to acquire the media content asset. As another example, recovery facility 504 may be at least partially implemented by a server remote from the second DVR system and may be configured to communicate with and direct the second DVR system to acquire the media content asset from the media content source, and the second DVR system may respond by acquiring the media content asset from the media content source, without the media content asset going through recovery facility 504 (e.g., without going through a server implementing recovery facility 504). As another example, recovery facility 504 may be at least partially implemented by a server remote from the second DVR system and may be configured to acquire and transmit the media content asset to the second DVR system.

After a media content asset included in the library of media content assets has been identified, recovery facility 504 may select, in accordance with a source selection heuristic, a media content source from which the media content asset is to be acquired. The selected media content source may include any source other than the first DVR system and may be selected in accordance with the source selection heuristic.

Figure 7:
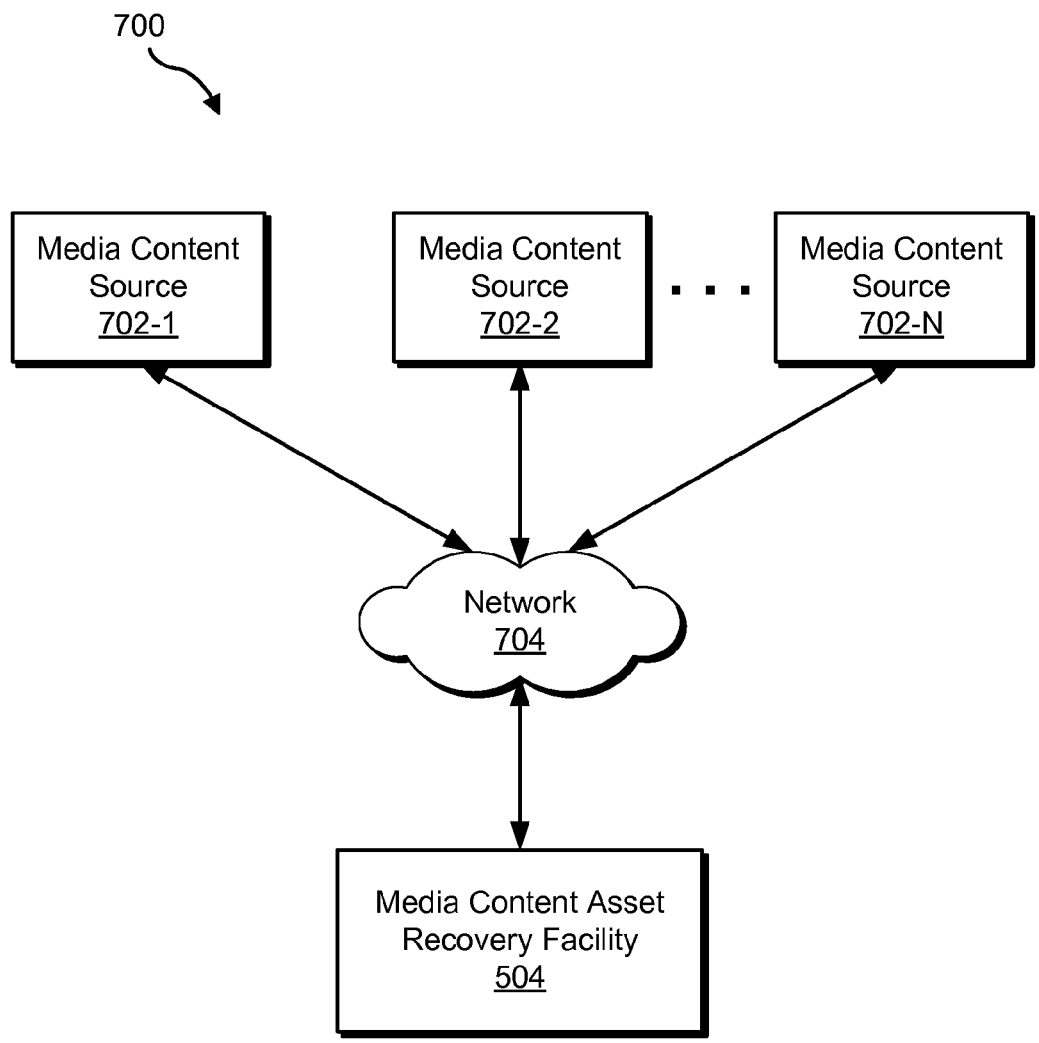
FIG. 7 shows an exemplary configuration in which a media content asset recovery facility may select a media content source from a plurality of media content sources according to principles described herein.

To illustrate, FIG. 7 shows an exemplary configuration 700 in which recovery facility 504 may select a media content source from a plurality of media content sources 702 (e.g., media content source data 702-1 through media content source 702-N). As shown, recovery facility 504 may communicate with media content sources 702 by way of a network 704, which may include any of the networks described herein.

Each media content source 702 may have one or more media content assets available for distribution. However, each media content source 702 may be distinct in terms of how it maintains and/or distributes a particular media content asset. For example, media content sources 702 may include an Internet source configured to maintain one or more downloadable files representative of the media content asset, a broadcast television source configured to broadcast the media content asset during a scheduled time period, a video-on-demand source configured to distribute the media content assets in the form of video-on-demand assets, a streaming content source configured to stream the media content asset on demand or during a scheduled time period, a multicast distribution source configured to multicast the media content asset during a scheduled time period, a DVR system associated with a different user account and configured to distribute the media content assets in accordance with a peer-to-peer file sharing heuristic, and/or any other type of media content source as may serve a particular implementation.

As another example, different versions of the same media content asset may be maintained and distributed by different media content sources 702. To illustrate, media content source 702-1 may maintain and distribute a version of a media content asset that has a particular video quality (e.g., standard definition ("SD"), high definition ("HD"), etc.), file size, and/or format (e.g., MPEG-4, AVI, etc.) while media content source 702-2 may maintain and distribute a version of the media content asset that has a different video quality, file size, and/or format. It will be recognized that the versions of the media content asset maintained by each media content source 702-1 may have any other unique attribute.

As mentioned, recovery facility 504 may select, in accordance with a source selection heuristic, a particular media content source (e.g., one of media content sources 702) from which a media content asset will be acquired. As used herein, a "source selection heuristic" may refer to any heuristic or technique that may be used by recovery facility 504 to select a particular media content source from which to acquire a particular media content asset for storage by the second DVR system. Using the source selection heuristic, recovery facility 504 may optimize a manner in which the media content asset is acquired.

To illustrate, the source selection heuristic may be based on a relative importance of a plurality of source selection factors associated with a plurality of media content sources. For example, recovery facility 504 may select a particular media content source from a plurality of media content sources by weighing a plurality of source selection factors associated with the plurality of media content sources and selecting the media content source from the plurality of media content sources in accordance with the weighing of the source selection factors.

The source selection factors considered by media content asset management facility 504 may include any factor associated with the media content sources and/or with an acquisition of the media content asset as may serve a particular implementation. For example, the source selection factors may include, but are not limited to, an acquisition time factor, a media quality factor, a data storage size factor, a data format factor, and an acquisition cost factor.

The relative importance of the source selection factors (i.e., a weighting of the source selection factors) may be determined automatically by recovery facility 504, specified by a user, and/or otherwise set as may serve a particular implementation. For example, media content asset management facility 504 may automatically weight a first source selection factor more than a second source selection factor by analyzing data included in the DVR data set associated with the second DVR system, identifying one or more tendencies of the user associated with the second DVR system, and/or in any other suitable manner.

Returning to FIG. 5, storage facility 506 may be configured to store DVR data 508 representative of one or more DVR data sets (e.g., DVR data sets being ported), attribute data 510 representative of one or more attributes of one or more DVR systems (e.g., second DVR system 404-2), and source selection heuristic data 512 representative of one or more source selection heuristics. Storage facility 506 may maintain additional or alternative data as may serve a particular implementation.

The rebuilding of a library of media content assets within the second DVR system may be based on any DVR data included in a DVR data set ported from the first DVR system to the second DVR system. For example, the identification and acquisition of a media content asset for storage by the second DVR system may be based on any of the metadata, settings data, and/or business logic data described herein. To illustrate, recovery facility 504 may identify, from metadata included in a ported DVR data set, a media content asset included in the library of media content assets stored by the first DVR system. Based on electronic program guide data, recovery facility 504 may determine that the media content program is scheduled to be rebroadcast at a particular time on a particular media content channel. Recovery facility 504 may direct the second DVR system to schedule a recording of the rebroadcast of the media content asset. The second DVR system may schedule the recording in accordance with any settings and/or business logic specified by settings data and/or business logic data included in the DVR data set ported from the first DVR system (e.g., start and stop times of the scheduled recording may be automatically adjusted based on settings and/or business logic in the ported DVR data set).

As described above, data migration system 500 may facilitate a migration of a user account from being associated with a first DVR system to being associated with a second DVR system. In some examples, the migration of the user account may include a DVR data set porting component (e.g., as represented by data management facility 502 creating and associating second DVR data set 602-2 with second DVR system 404-2 in FIG. 6) followed temporally by a media content asset recovery component (e.g., as represented by recovery facility 504 acquiring media content assets from one or more media content sources 702 for second DVR system 404-2 in FIG. 7), which may allow the DVR data set ported from the first DVR system to the second DVR system to be used to rebuild, within the second DVR system, a library of media content assets stored by the first DVR system. Such a migration of a user account may be referred to as a "DVR-data-set-driven migration" of the user account.

In certain examples, the migration of the user account from the first DVR system to the second DVR system may be performed in any of the ways described in more detail in co-pending U.S. patent application Ser. No. 13/731,571, filed the same day as the present application, and entitled "Methods and Systems for Facilitating Migration of a User Account from a First Digital Video Recording ("DVR") System to a Second DVR System" and/or co-pending U.S. patent application Ser. No. 13/731,619, filed the same day as the present application, and entitled "Media Content Asset Recovery Methods and Systems." The contents of both of these applications are incorporated herein by reference in their entirety.

A migration of a user account from being associated with a first DVR system to being associated with a second DVR system may include one or more conditions associated therewith. The conditions associated with the migration may include any characteristics of migration operations, DVR data sets, media content assets, media content sources, availability of media content assets (e.g., access rights to media content assets), user accounts (e.g., subscription packages associated with user accounts), and/or any other elements associated with the migration, the user account, and/or the DVR systems involved in the migration.

One or more conditions associated with the migration may be representative of opportunities to promote products, services, and/or features thereof to a user associated with the user account. Conditions representative of such promotion opportunities may be defined (e.g., in advance by a service provider) for detection and use as a basis to provide promotional content to the user associated with the user account. This may facilitate a providing of promotional content to the user associated with the user account based on one or more conditions of the migration of the user account.

Figure 8:
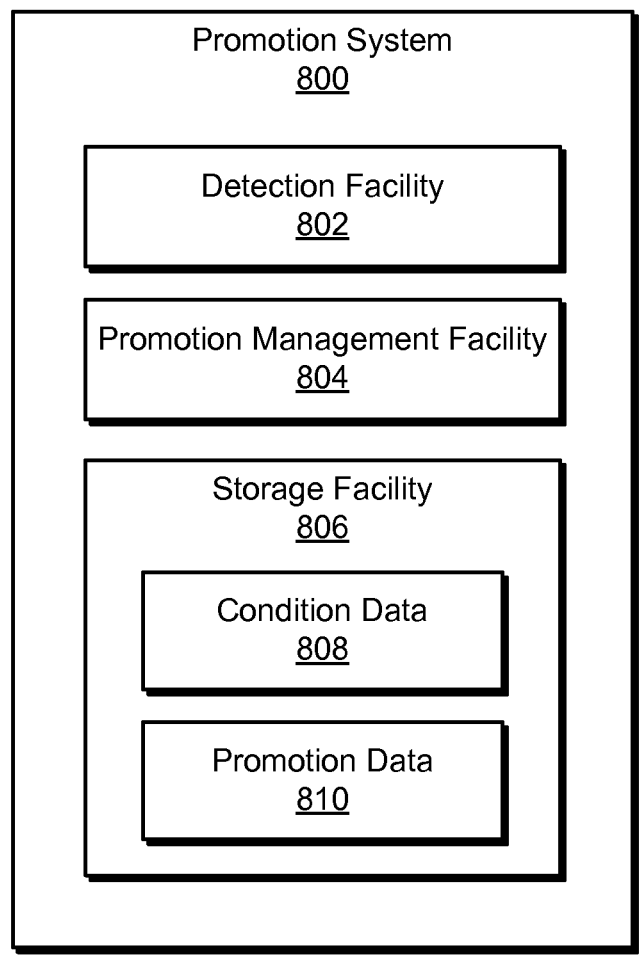
FIG. 8 illustrates an exemplary promotion system according to principles described herein.

To this end, FIG. 8 illustrates an exemplary promotion system 800 ("system 800") configured to provide promotional content based on a migration of a user account from a first DVR system to a second DVR system. As shown, system 800 may include, without limitation, a detection facility 802, a promotion management facility 804, and a storage facility 806 selectively and communicatively coupled to one another. It will be recognized that although facilities 802-806 are shown to be separate facilities in FIG. 8, any of facilities 802-806 may be combined into fewer facilities, such as into a single facility, or divided into more facilities as may serve a particular implementation.

System 800 may be implemented by any suitable combination of computing devices and/or systems. For example, facilities 802-806 of system 800 may be implemented entirely by media content provider system 104, by a server not associated with media content provider system 104, by a DVR system (e.g., first DVR system 404-1 or second DVR system 404-2), and/or by any other device and/or system. Alternatively, facilities 802-806 of system 800 may be distributed across any combination of these systems and/or devices.

Detection facility 802 may be configured to detect a promotion opportunity based on a condition associated with a migration of a user account from being associated with a first DVR system to being associated with a second DVR system. Detection facility 802 may detect the promotion opportunity based on the condition associated with the migration in any suitable way. For example, detection facility 802 may be configured to determine whether one or more conditions associated with the migration match one or more predefined conditions representative of a promotion opportunity. In certain examples, this determination may include comparing conditions associated with the migration to conditions data 808 stored by storage facility 806, where the conditions data 808 represents one or more conditions that have been predefined to represent promotion opportunities. Alternatively, detection facility 802 may be configured to analyze conditions associated with the migration in any other way suitable to detect whether the conditions represent a promotion opportunity associated with the migration.

Examples of conditions that represent promotion opportunities associated with a migration may include, without limitation, conditions that indicate a lack of access to a media content asset associated with the migration (e.g., a lack of access by the second DVR system to a media content asset included in the library of media content assets stored by the first DVR system), conditions that indicate that a higher quality version of an asset is available for access (e.g., the second DVR system has access to a higher quality version of a media content asset included in the library of media content assets stored by the first DVR system), conditions that indicate incomplete media content assets (e.g., a media content asset included in the library of media content assets stored by the first DVR system is an incomplete recording of a media program, or a set of media content assets included in the library of media content assets stored by the first DVR system is an incomplete set of media content assets such as an incomplete collection of episodes in a television series), conditions that indicate that a media content asset included in the library of media content assets stored by the first DVR system includes a stale advertisement or other stale promotional content (e.g., a recording of the media content asset is older than a predetermined recording age threshold or was created earlier in time than the most recent broadcast of a media program included in the media content asset), and conditions that indicate that the user has an interest in a particular attribute of media content (e.g., a particular type of media program, actor, genre, etc.). Such conditions may be predefined and represented by condition data 808 for use by detection facility 802 to detect promotional opportunities associated with a migration of a user account from being associated with a first DVR system to being associated with a second DVR system. These and other examples of conditions that represent promotion opportunities are described in more detail herein.

Conditions associated with a migration of a user account from being associated with a first DVR system to being associated with a second DVR system may include porting conditions associated with a DVR data set porting component of the migration and/or recovery conditions associated with a media content asset recovery component of the migration.

Detection facility 802 may be configured to detect a promotion opportunity based on a condition associated with a migration of a user account at any suitable time. For example, detection facility 802 may be configured to detect the promotion opportunity associated with the migration during the migration (e.g., during porting and/or recovery components of the migration) and/or after the migration. In certain examples, detection facility 802 may detect the promotional opportunity associated with the migration in conjunction with (e.g., during and/or based on conditions of) the DVR data set porting component and/or the media content asset recovery component of the migration. Additionally or alternatively, detection facility 802 may be configured to detect the promotion opportunity associated with the migration before the migration, such as when the user is exploring migration options before providing a migration request.

Promotion management facility 804 may be configured to provide, based on a detected promotion opportunity and/or condition associated with the migration, promotional content for access by a user associated with the user account associated with the migration. Promotion management facility 804 may provide the promotional content for access by the user in any suitable way. As an example, promotion management facility 804 may provide the promotional content for presentation in a user interface (e.g., for display in a graphical user interface). As another example, promotion management facility 804 may provide the promotional content by inserting an advertisement in a media content asset associated with the migration. For instance, promotion management facility 804 may replace a stale advertisement (e.g., an advertisement produced a relatively long time prior to the migration) with a new advertisement (e.g., an advertisement produced a relatively short time prior to the migration) in the media content asset. As another example, promotion management facility 804 may provide the promotional content by recommending a media content asset (e.g., a media content asset not associated with the migration) to the user. These and other examples of promotional content are described in more detail herein.

Promotion management facility 804 may be configured to provide promotional content for access by the user at any suitable time. For example, promotion management facility 804 may be configured to provide the promotional content in response to a detection by detection facility 802 of a promotion opportunity associated with the migration, during the migration (e.g., during the porting and/or recovery components of the migration), and/or after the migration. In certain examples, detection facility 802 may provide the promotional content in conjunction with (e.g., during and/or as part of) the DVR data set porting component and/or the media content asset recovery component of the migration. Additionally or alternatively, promotion management facility 804 may be configured to provide the promotional content before the migration, such as when the user is exploring migration options before providing a migration request.

Storage facility 806 may be configured to store condition data 808 representative of one or more conditions (e.g., current conditions associated with a migration and/or predefined conditions indicative of promotion opportunities) and promotion data 810 representative of promotional content. Storage facility 806 may maintain additional or alternative data as may serve a particular implementation.

Examples of promotional content that may be provided by promotion management facility 804 will now be described in more detail. As mentioned, promotion management facility 804 may provide promotional content for presentation within a user interface. The promotional content may be presented within any user interface accessible by the user of the user account that is the subject of the migration from the first DVR system to the second DVR system, including within a user interface that is associated with the migration and/or a user interface not associated with the migration. In certain examples, the user interface may be provided by the second DVR system in conjunction with the migration (e.g., in conjunction with the media content asset recovery component of the migration).

Figure 9:
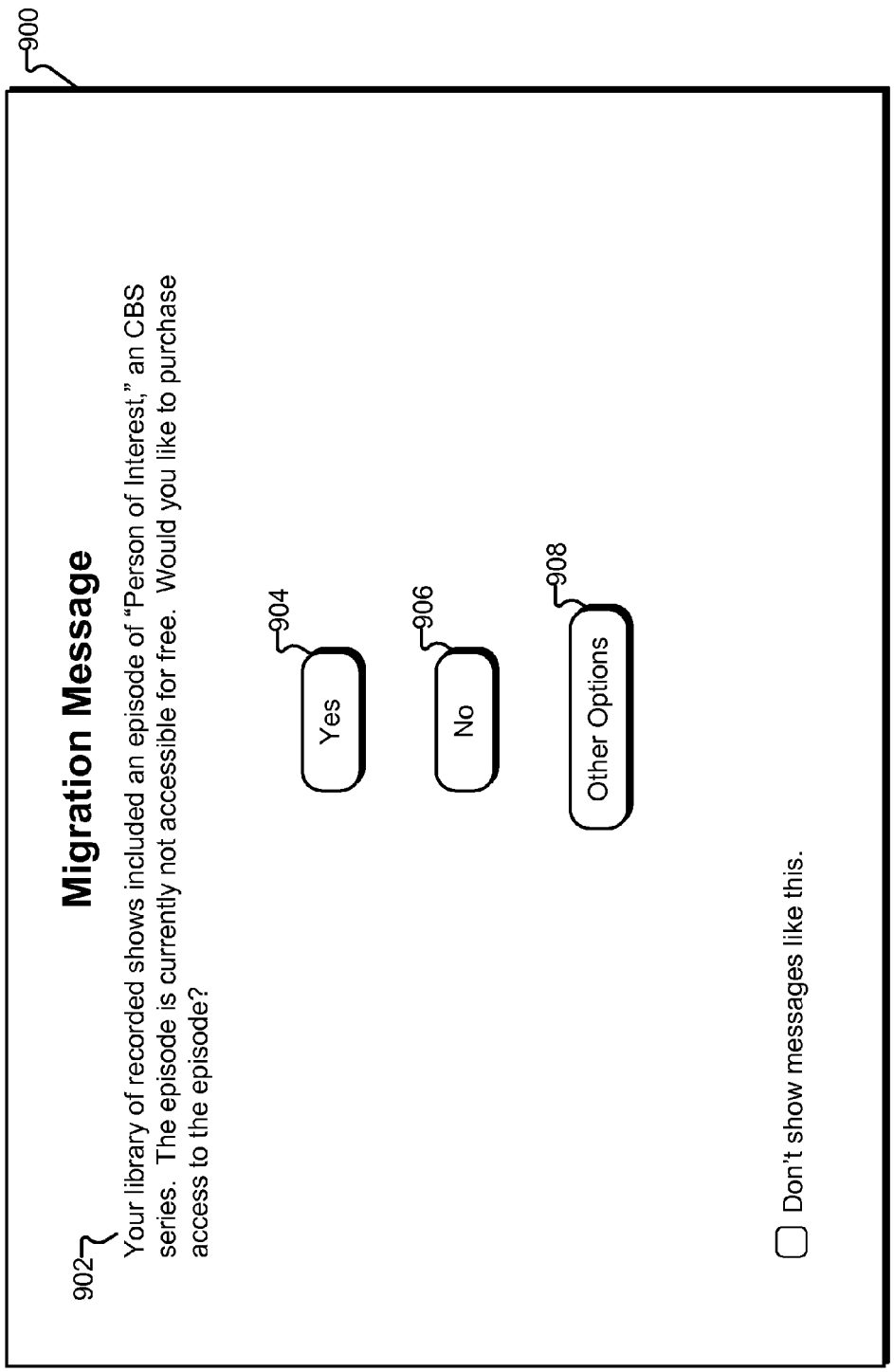
FIGS. 9-16 show exemplary graphical user interfaces in accordance with the methods and systems described herein.

FIG. 9 shows an exemplary graphical user interface ("GUI") 900 that may be presented to a user and that may include promotional content provided by promotion management facility 804 based on a migration of a user account, such as described herein. As shown, GUI 900 may include promotional content in the form of a migration message 902 that notifies the user of a lack of free access to a media content asset associated with the migration. In the illustrated example, free access to an episode of a television series titled "Person of Interest" has not been found. For instance, during the media content asset recovery component of the migration, recovery facility 504 may identify and attempt to acquire the episode from one or more media content sources. Recovery facility 504 may be unable to locate free access to the episode. For example, recovery facility 504 may determine that there is no record of an upcoming scheduled rebroadcast of the episode and/or that the user account does not have access to any media content sources that will provide the episode to the user for free. Recovery facility 504 may further determine that the episode is available for access by the user from a media content source for a price. Detection facility 802 may detect this condition, and promotion management facility 804 may provide migration message 902 for presentation in GUI 900 based on the detected condition. As shown, migration message 902 may be configured to notify the user of the lack of free access to the episode.

To further illustrate, the promotional content in GUI 900 may include an option 904 configured to be selected by the user to facilitate a purchase of access to the episode. In response to a user selection of option 904, GUI 900 may be updated to present additional information and/or options for purchasing access to the episode to the user. For example, the information may indicate a source from which access to the episode may be purchased and a purchase price. An option may be selected by the user to initiate a purchase of access to the episode by the second DVR system. After purchase of the episode, the second DVR system may access (e.g., download and/or record) the episode from the source.

GUI 900 may further include an option 906 configured to be selected by the user to indicate that the user does not want to purchase access to the episode. In response to a user selection of option 906, GUI 900 may be closed.

GUI 900 may further include an option 908 configured to be selected by the user to access one or more other options associated with the episode. For example, the other options may include an option to add the episode to a watch list such that the second DVR system will monitor for a future opportunity to access the episode (e.g., to record a scheduled transmission of the episode) for free. If such an opportunity is detected, the second DVR system may notify the user and/or automatically access (e.g., record) the episode.

Figure 10:
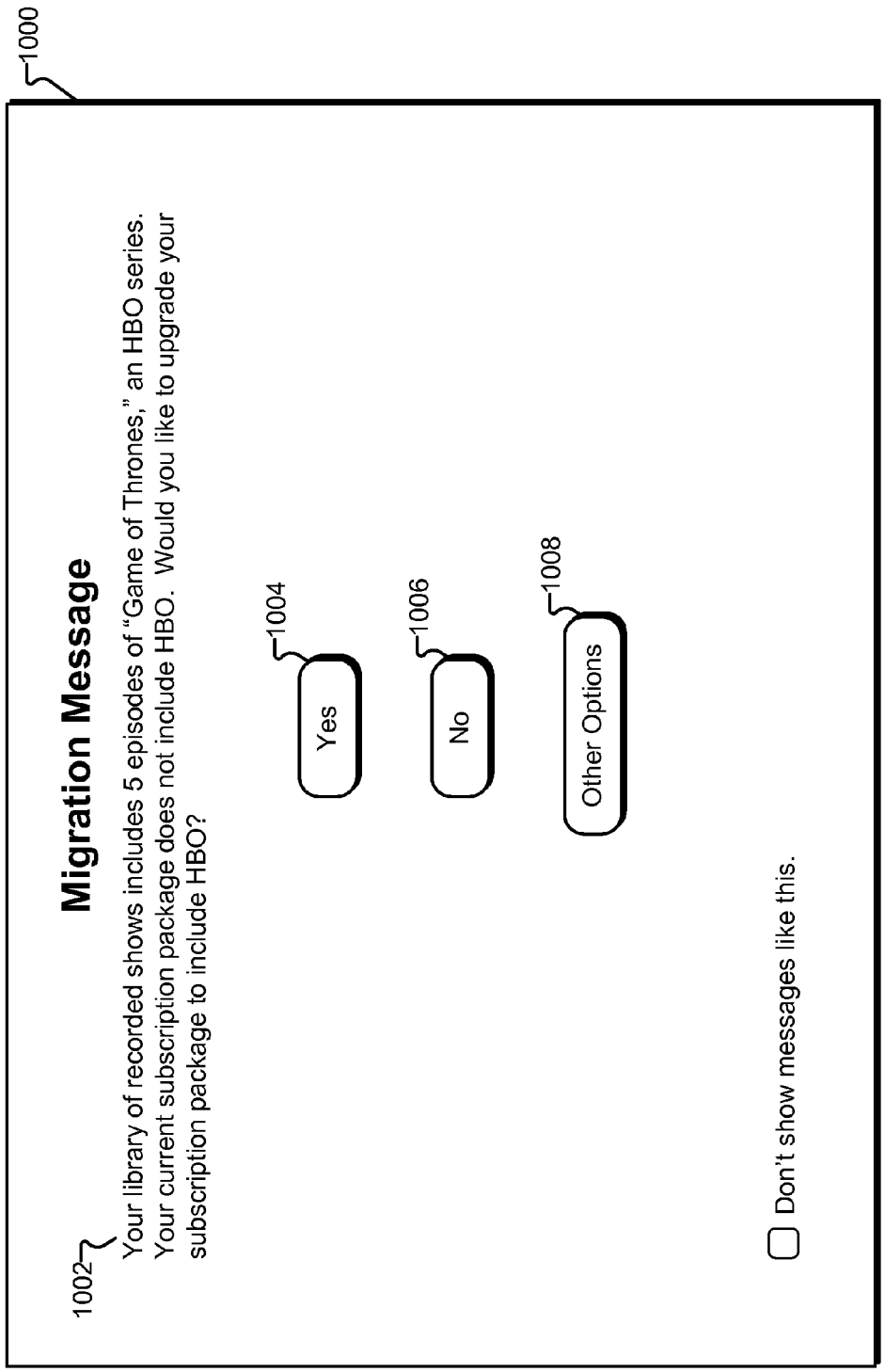

FIG. 10 shows an exemplary GUI 1000 that may be presented to a user and that may include promotional content provided by promotion management facility 804 based on a migration of a user account, such as described herein. As shown, GUI 1000 may include promotional content in the form of a migration message 1002 that notifies the user of a lack of access to one or more media content assets associated with the migration. In the illustrated example, access to a number of episodes of a television series titled "Game of Thrones" is unavailable because a current subscription package associated with user account on the second DVR system does not include access to a content provider channel known as "HBO" and on which the television series is provided. For instance, the current subscription package may include a channel lineup that does not include HBO. In some examples, during the media content asset recovery component of the migration, recovery facility 504 may identify and attempt to acquire the episodes from the HBO channel and determine that the user account does not have access to the HBO channel. Detection facility 802 may detect this condition, and promotion management facility 804 may provide migration message 1002 for presentation in GUI 1000 based on the detected condition. As shown, migration message 1002 may be configured to notify the user of the lack of access to the HBO channel and an option to upgrade the current subscription package to include access to the HBO channel.

The promotional content in GUI 1000 may include an option 1004 configured to be selected by the user to facilitate an upgrade of the subscription package associated with the user account. In response to a user selection of option 1004, GUI 1000 may be updated to present additional information and/or options for upgrading the subscription package to another subscription package that includes access to the HBO channel. After the user completes such an upgrade, the second DVR system may attempt to access (e.g., download and/or record) the episodes of "Game of Thrones" from one or more HBO sources, including the HBO channel.

GUI 1000 may further include an option 1006 configured to be selected by the user to indicate that the user does not want to upgrade his or her subscription package. In response to a user selection of option 1006, GUI 1000 may be closed.

GUI 1000 may further include an option 1008 configured to be selected by the user to access one or more other options associated with the episodes of "Game of Thrones." For example, the other options may include an option to purchase episodes of "Game of Thrones" from one or more other sources, such as by purchasing a complete season of the "Game of Thrones" from a media content source.

Figure 11:
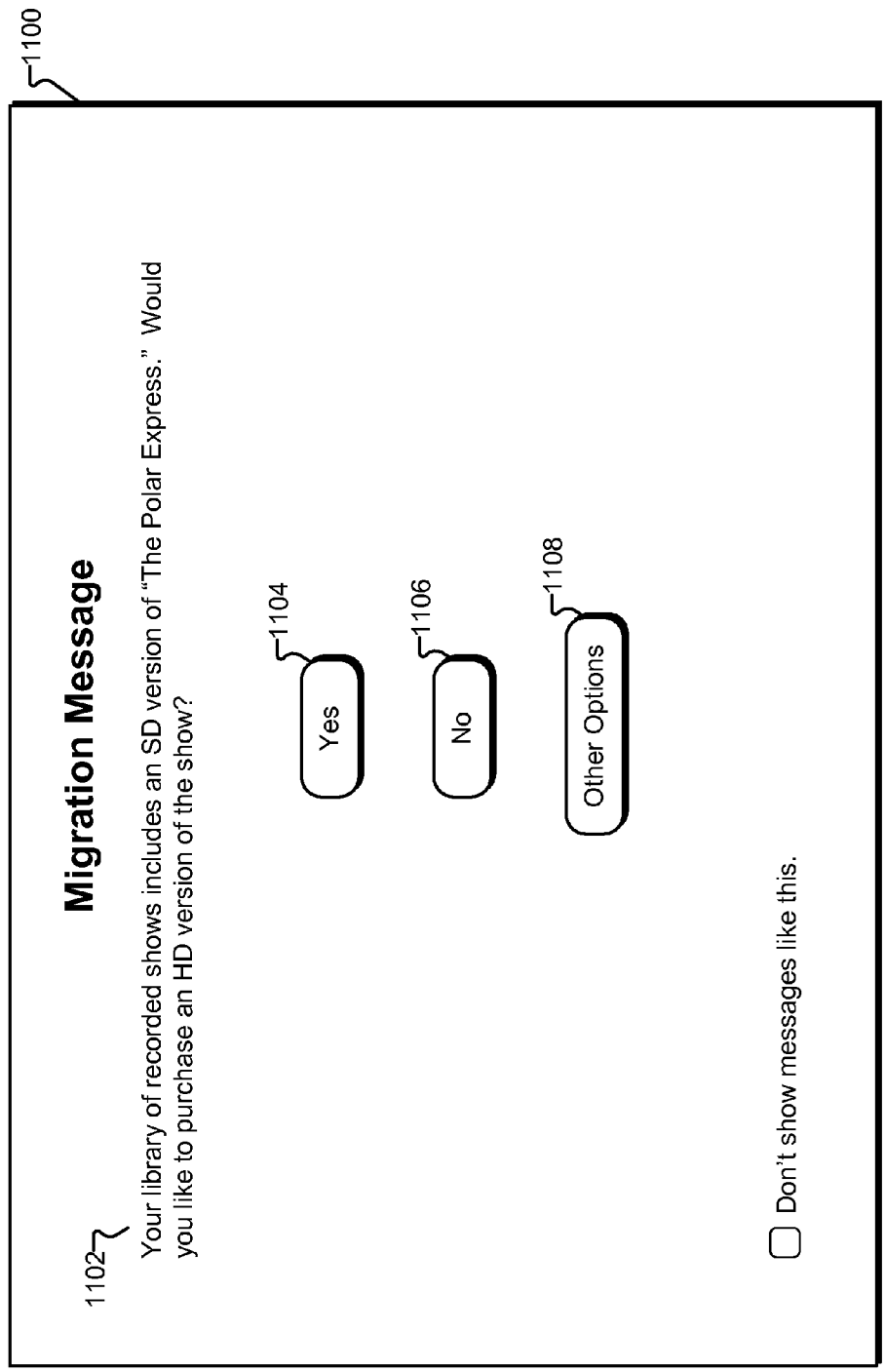

FIG. 11 shows an exemplary GUI 1100 that may be presented to a user and that may include promotional content provided by promotion management facility 804 based on a migration of a user account, such as described herein. As shown, GUI 1100 may include promotional content in the form of a migration message 1102 that notifies the user of an availability to the second DVR system of a version of a media content asset that is relatively better (e.g., in quality such as resolution) than the version of the media content asset stored by the first DVR system. In the illustrated example, the library of media content assets stored by the first DVR system includes an SD version of a movie titled "The Polar Express," and the migration message 1102 notifies the user that an HD version of the movie is available for purchase. In some examples, during the media content asset recovery component of the migration, recovery facility 504 may identify and attempt to acquire the movie from one or more media content sources and may determine that an HD version of the movie is available from one or more of the media content sources. Detection facility 802 may detect this condition, and promotion management facility 804 may provide migration message 1102 for presentation in GUI 1100 based on the detected condition. As shown, migration message 1102 may be configured to notify the user of the availability of an HD version of the movie for purchase.

The promotional content in GUI 1100 may further include an option 1104 configured to be selected by the user to facilitate a purchase of the HD version of the media content asset. In response to a user selection of option 1104, GUI 1100 may be updated to present additional information and/or options for purchasing the HD version of the movie (e.g., options to purchase the HD version of the movie outright or to purchase an upgrade from the SD version to the HD version of the movie). After the user completes such a purchase, the second DVR system may attempt to access (e.g., download and/or record) the HD version of the movie from a media content source.

GUI 1100 may further include an option 1106 configured to be selected by the user to indicate that the user does not want to purchase an HD version of the movie. In response to a user selection of option 1106, GUI 1100 may be closed.

GUI 1100 may further include an option 1108 configured to be selected by the user to access one or more other options associated with the movie. For example, the other options may include an option to add an entry for an HD version of the movie to a watch list such that the second DVR system will monitor for a future opportunity to access an HD version of the movie (e.g., to record a scheduled transmission of the movie on an HD media content channel) for free. If such an opportunity is detected, the second DVR system may notify the user and/or automatically access an HD version of the movie.

Figure 12:
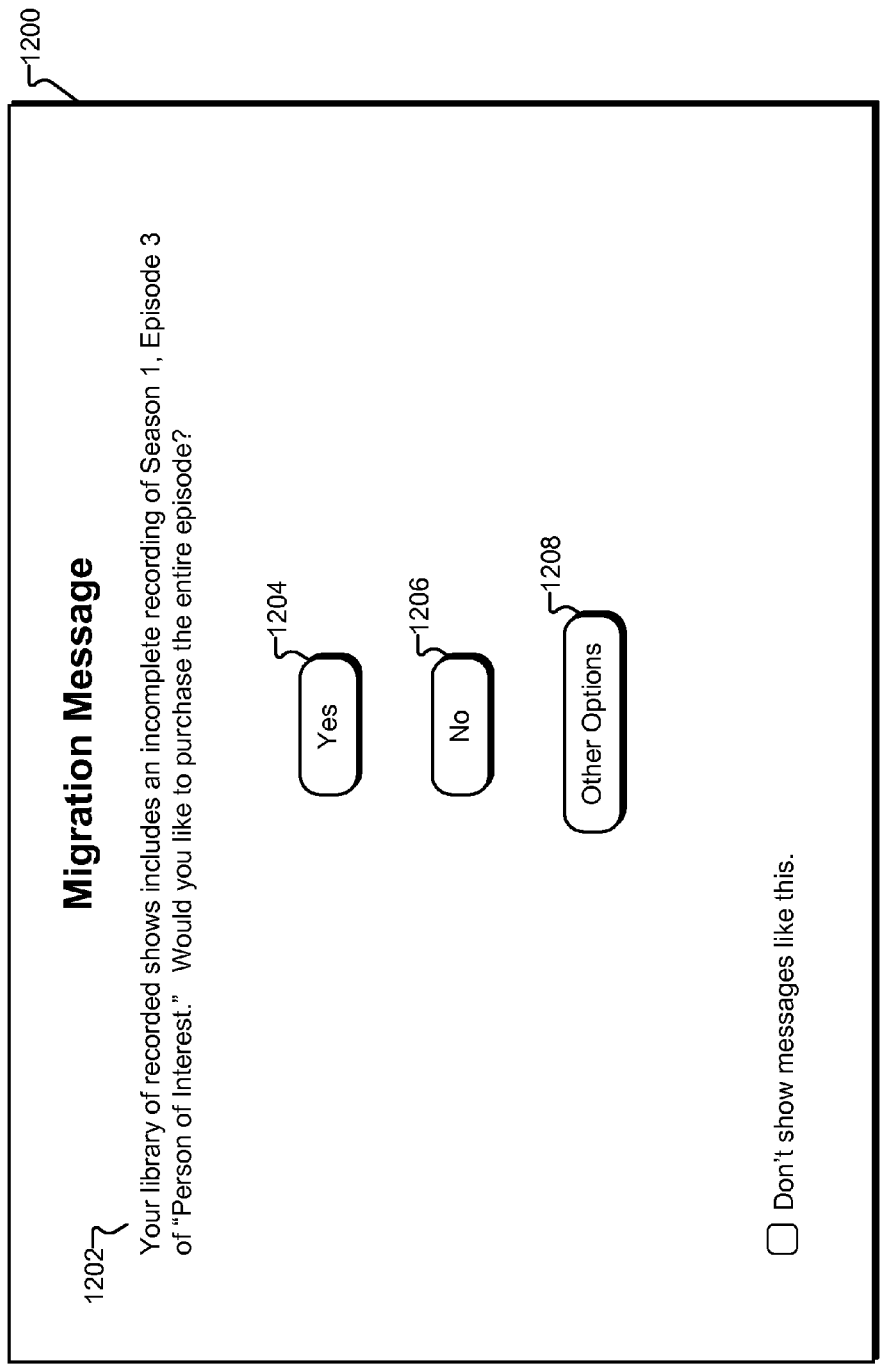

FIG. 12 shows an exemplary GUI 1200 that may be presented to a user and that may include promotional content provided by promotion management facility 804 based on a migration of a user account, such as described herein. As shown, GUI 1200 may include promotional content in the form of a migration message 1202 that notifies the user of an incomplete media content asset (e.g., a partially recorded media content asset) stored by the first DVR system. In the illustrated example, the library of media content assets stored by the first DVR system includes an incomplete recording of the first season, third episode of a television program known as "Person of Interest," and the migration message 1202 notifies the user of the incomplete recording and that the entire episode is available for purchase. In some examples, during the media content asset recovery component of the migration, recovery facility 504 may use metadata to identify the episode and determine that the recording of the episode is incomplete. Detection facility 802 may detect this condition, and promotion management facility 804 may provide migration message 1202 for presentation in GUI 1200 based on the detected condition. As shown, migration message 1202 may be configured to notify the user of the availability of the entire episode for purchase.

The promotional content in GUI 1200 may further include an option 1204 configured to be selected by the user to facilitate a purchase of the complete episode. In response to a user selection of option 1204, GUI 1200 may be updated to present additional information and/or options for purchasing the episode (e.g., options to purchase the complete episode outright or to purchase an upgrade from the incomplete episode to the complete episode). After the user completes such a purchase, the second DVR system may attempt to access (e.g., download and/or record) the complete episode from a media content source.

GUI 1200 may further include an option 1206 configured to be selected by the user to indicate that the user does not want to purchase the complete episode. In response to a user selection of option 1206, GUI 1200 may be closed.

GUI 1200 may further include an option 1208 configured to be selected by the user to access one or more other options associated with the episode. For example, the other options may include an option to add an entry for the episode to a watch list such that the second DVR system will monitor for a future opportunity to access a complete version of the episode (e.g., to record a scheduled rebroadcast of the episode) for free. If such an opportunity is detected, the second DVR system may notify the user and/or automatically access the complete version of the episode.

Figure 13:
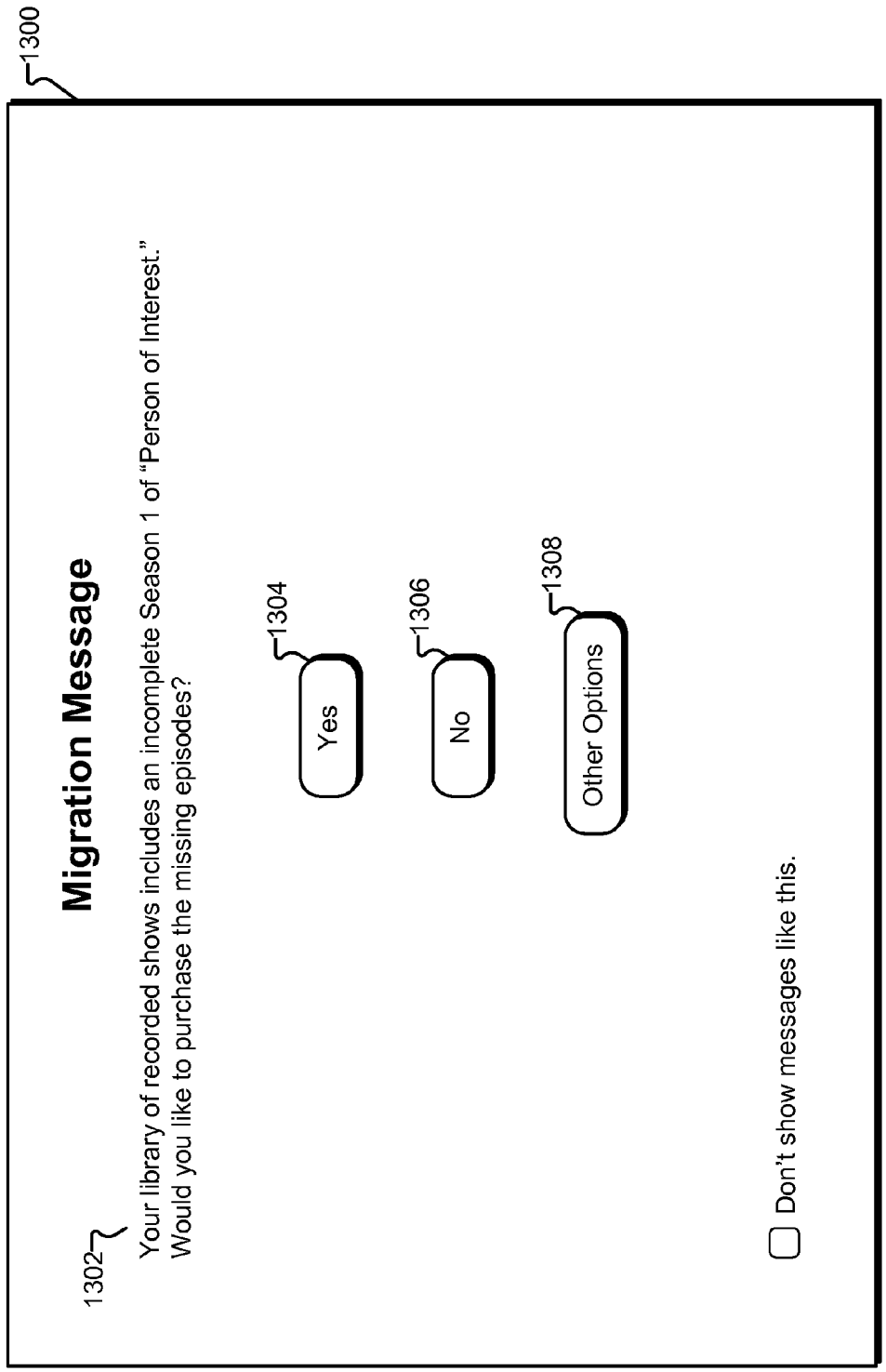

FIG. 13 shows an exemplary GUI 1300 that may be presented to a user and that may include promotional content provided by promotion management facility 804 based on a migration of a user account, such as described herein. As shown, GUI 1300 may include promotional content in the form of a migration message 1302 that notifies the user of an incomplete set of media content assets stored by the first DVR system. In the illustrated example, the library of media content assets stored by the first DVR system includes an incomplete set of episodes from the first season of a television program known as "Person of Interest," and the migration message 1302 notifies the user of the incomplete series and that the missing episodes and/or the entire series is available for purchase. In some examples, during the media content asset recovery component of the migration, recovery facility 504 may use metadata to identify the episodes and determine that the episodes are an incomplete collection of episodes of the first season episodes of the television series. Detection facility 802 may detect this condition, and promotion management facility 804 may provide migration message 1302 for presentation in GUI 1300 based on the detected condition. As shown, migration message 1302 may be configured to notify the user of the incompleteness of the set of recorded episodes and the availability of the missing episodes and/or the complete series for purchase.

The promotional content in GUI 1300 may further include an option 1304 configured to be selected by the user to facilitate a purchase of the missing episodes and/or the complete first season of episodes of the television series. In response to a user selection of option 1304, GUI 1300 may be updated to present additional information and/or options for purchasing the episodes (e.g., options to purchase the missing episodes individually or as a group or to purchase the complete first season of episodes of the television series). After the user completes such a purchase, the second DVR system may attempt to access (e.g., download and/or record) the purchased episodes from a media content source.

GUI 1300 may further include an option 1306 configured to be selected by the user to indicate that the user does not want to purchase the missing episodes or the complete first season of episodes of the television series. In response to a user selection of option 1306, GUI 1300 may be closed.

GUI 1300 may further include an option 1308 configured to be selected by the user to access one or more other options associated with the incomplete set of episodes. For example, the other options may include an option to add an entry for one or more of the missing episodes of the television series to a watch list such that the second DVR system will monitor for a future opportunity to access the missing episode(s) (e.g., to record scheduled rebroadcasts of the episode(s)) for free. If such an opportunity is detected, the second DVR system may notify the user and/or automatically access the episode(s).

Figure 14:
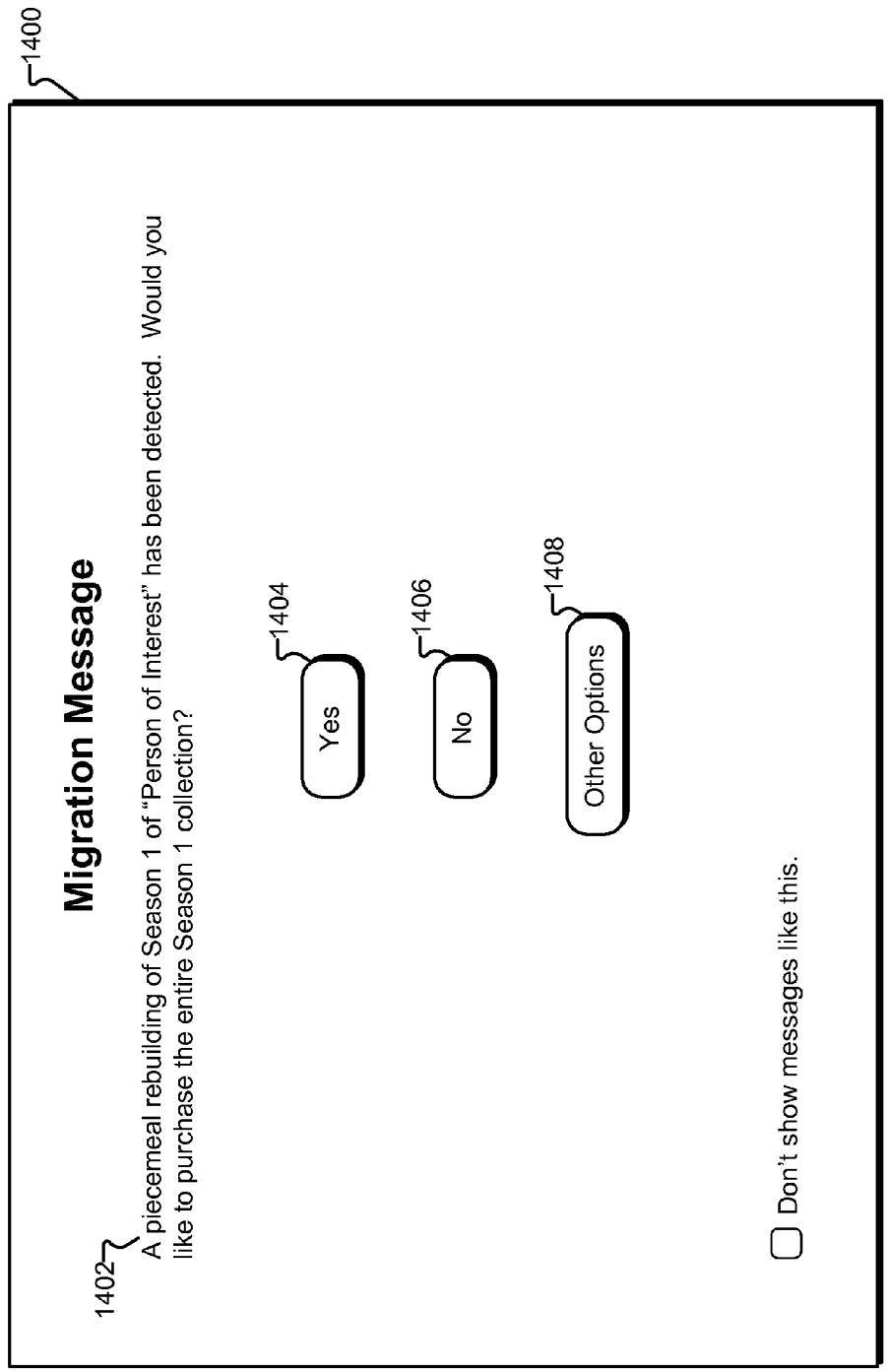

FIG. 14 shows an exemplary GUI 1400 that may be presented to a user and that may include promotional content provided by promotion management facility 804 based on a migration of a user account, such as described herein. As shown, GUI 1400 may include promotional content in the form of a migration message 1402 that notifies the user of a detected piecemeal rebuilding of a set of media content assets stored by the first DVR system. In the illustrated example, the library of media content assets stored by the first DVR system may include a complete or incomplete set of episodes from the first season of a television program known as "Person of Interest," and the migration message 1402 notifies the user of a piecemeal rebuilding of the series. In some examples, during the media content asset recovery component of the migration, recovery facility 504 may use metadata to identify and attempt to acquire the episodes from one or more media content sources in piecemeal fashion. Detection facility 802 may detect this condition, and promotion management facility 804 may provide migration message 1402 for presentation in GUI 1400 based on the detected condition. As shown, migration message 1402 may be configured to notify the user of the piecemeal rebuilding of the set of recorded episodes and the availability of the complete set of episodes for purchase.

The promotional content in GUI 1400 may further include an option 1404 configured to be selected by the user to facilitate a purchase of the complete first season of episodes of the television series. In response to a user selection of option 1404, GUI 1400 may be updated to present additional information and/or options for purchasing the complete first season of episodes (e.g., as a group). After the user completes such a purchase, the second DVR system may attempt to access (e.g., download and/or record) the purchased complete first season of episodes of the television series from a media content source.

GUI 1400 may further include an option 1406 configured to be selected by the user to indicate that the user does not want to purchase the complete first season of episodes of the television series. In response to a user selection of option 1406, GUI 1400 may be closed.

GUI 1400 may further include an option 1408 configured to be selected by the user to access one or more other options associated with the piecemeal rebuilding of the set of episodes, such as an option to purchase only a remainder of the episodes that have not already been acquired by the second DVR system.

Figure 15:
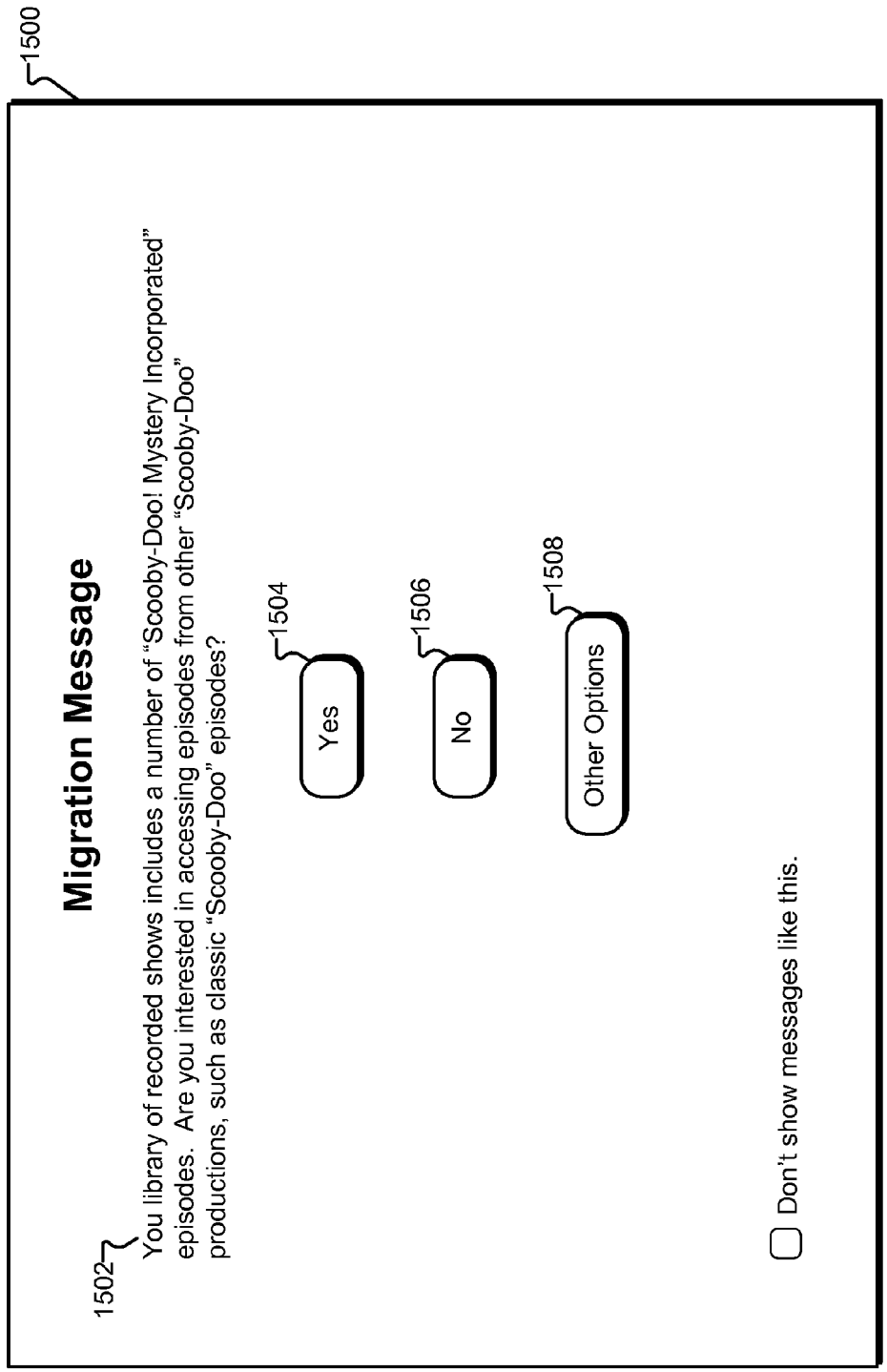

FIG. 15 shows an exemplary GUI 1500 that may be presented to a user and that may include promotional content provided by promotion management facility 804 based on a migration of a user account, such as described herein. As shown, GUI 1500 may include promotional content in the form of a migration message 1502 that recommends one or more media content assets based on a relation to the library of media content assets stored by the first DVR system. In the illustrated example, the library of media content assets stored by the first DVR system includes a number of episodes of a television series known as "Scooby-Doo! Mystery Incorporated," and the migration message 1502 notifies the user of related media content assets available for access (e.g., purchase) by the second DVR system. In some examples, during the media content asset recovery component of the migration, recovery facility 504 may use metadata to identify the episodes and determine that the episodes are part of a particular television series. Detection facility 802 may detect this condition, and promotion management facility 804 may provide migration message 1502 for presentation in GUI 1500 based on the detected condition. As shown, migration message 1502 may be configured to notify the user of an availability of one or more media content assets that are recommended based on their relation to (e.g., a sharing of at least one common attribute with) the library of media content assets stored by the first DVR system. In the illustrated example, the recommended media content assets include episodes of other "Scooby-Doo" productions, such as classic "Scooby-Doo" episodes.

The promotional content in GUI 1500 may further include an option 1504 configured to be selected by the user to facilitate access to (e.g., purchase of) the related media content assets. In response to a user selection of option 1504, GUI 1500 may be updated to present additional information and/or options for accessing the episodes (e.g., options to purchase specific episodes, seasons, and/or series of "Scooby-Doo" productions). After the user completes a purchase of such episodes, the second DVR system may attempt to access (e.g., download and/or record) the purchased episodes from a media content source.

Additionally or alternatively, promotion management facility 804 may recommend a service package such as a subscription package based on a migration-based detection of user interest in media content having a particular attribute. For example, detection facility 802 may detect a number of recordings of Major League Baseball ("MLB") playoff games in the library of media content assets stored by the first DVR system. Based on this detected condition, promotion facility 804 may recommend a MLB subscription package that provides access to MLB games.

GUI 1500 may further include an option 1506 configured to be selected by the user to indicate that the user does not want to access the recommended episodes. In response to a user selection of option 1506, GUI 1500 may be closed.

GUI 1500 may further include an option 1508 configured to be selected by the user to access one or more other options associated with the incomplete set of episodes. For example, the other options may include an option to add an entry for one or more of the recommended episodes to a watch list such that the second DVR system will monitor for a future opportunity to access the recommended episode(s) (e.g., to record scheduled rebroadcasts of the episode(s)) for free. If such an opportunity is detected, the second DVR system may notify the user and/or automatically access the episode(s).

Figure 16:
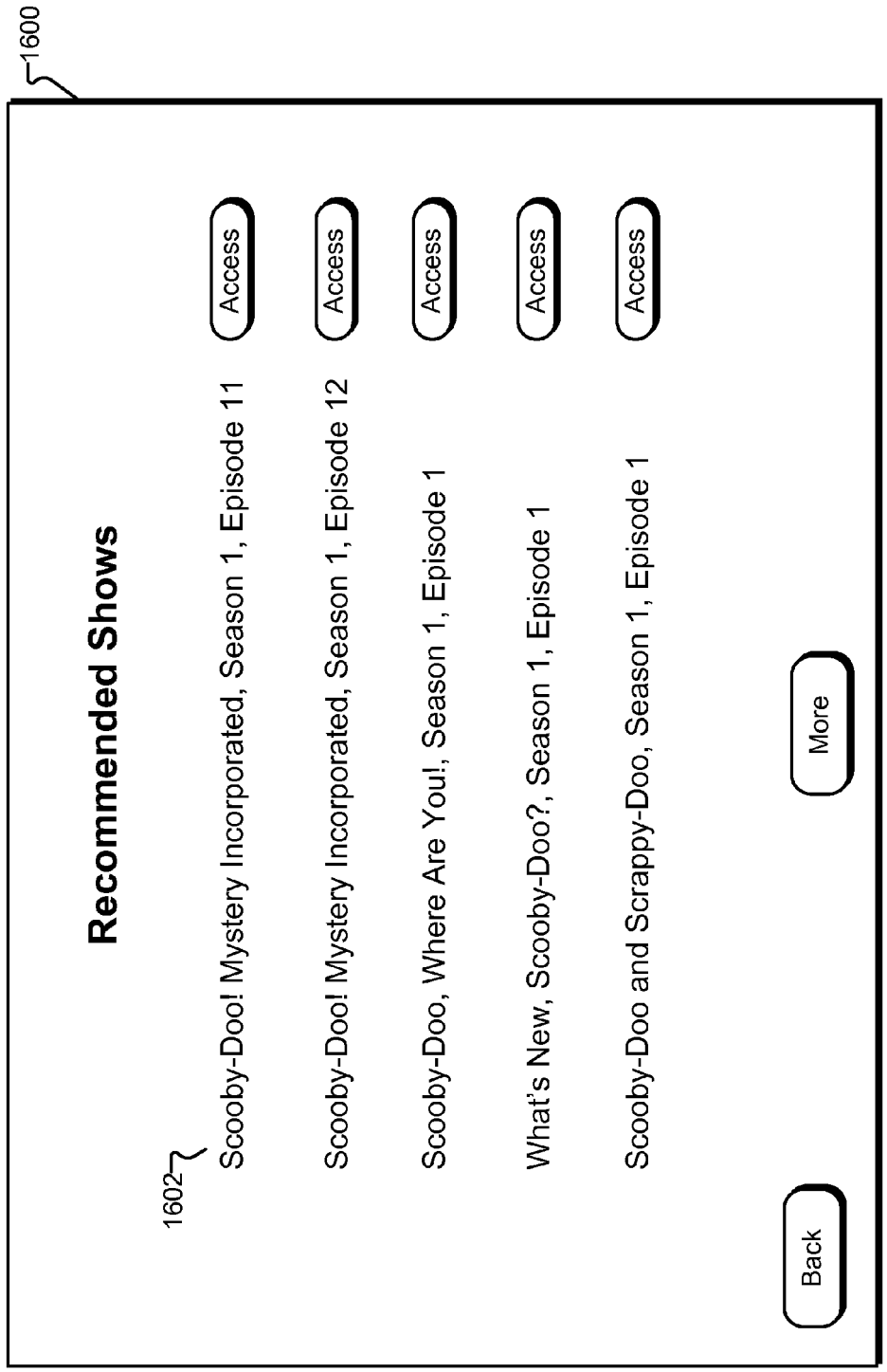

FIG. 16 shows an exemplary GUI 1600 that may be presented to user and that may include promotional content in the form of specific media content recommendations 1602 that are based at least in part on a migration of a user account from the first DVR system to the second DVR system. In the illustrated example, recommendations 1602 recommend various episodes of "Scooby-Doo" productions. The recommended episodes may be selected for inclusion in GUI 1600 based at least in part on a detection of a migration condition indicating a prevalence of other "Scooby-Doo" episodes associated with the migration of the user account to the second DVR system.

In certain examples, GUI 1600 may be presented in conjunction with the migration. For example, GUI 1600 may be presented in response to a user selection of option 1504 in GUI 1500.

In other examples, GUI 1600 may be presented not in conjunction with the migration although the recommendations 1602 may be based at least in part on data associated with the migration. For example, in addition or alternative to presenting promotional content recommending one or more media content assets not associated with the migration (and/or a subscription package) to a user based on a condition associated with the migration, such as described above, promotion management facility 804 may be configured to provide data associated with the migration to a recommendation engine for use to educate the recommendation engine. The data provided to the recommendation engine may be indicative of one or more migration conditions and/or operations, media content assets associated with the migration, information derived from the migration (e.g., data indicative of interests of a user derived from the migration), user interactions associated with the migration (e.g., a user interaction that instructs system 500 to upgrade from SD to HD media content assets during migration operations), and/or any other information associated with the migration.

The recommendation engine may be configured to use the data received from promotion management facility 804 to identify and recommend media content assets in conjunction with one or more non-migration operations of the second DVR system (rather than in conjunction with the migration). For example, in conjunction with non-migration operations of the second DVR system (which operations may be performed at any suitable time during or after the migration), the recommendation engine may provide promotional content in the form of media content recommendations 1602 for access by the user of the second DVR system. While the recommendations 1602 may be provided in conjunction with non-migration operations of the second DVR system, the recommendations may be based, at least in part, on conditions associated with the migration.

In certain examples, promotion management facility 804 may be configured to provide, based on a condition associated with a migration of a user account from a first DVR system to a second DVR system, promotional content in the form of one or more advertisements included in media content assets (e.g., media content assets associated with the migration). The advertisements may be presented to a user associated with the user account during playback of the media content assets (e.g., by the second DVR system).

To illustrate, a condition associated with the migration may indicate that a media content asset included in the library of media content assets stored by the first DVR system includes a stale advertisement or other promotional content (e.g., a recording of the media content asset that is older than a predetermined recording age threshold or was created earlier in time than the most recent broadcast of a media program included in the media content asset). Detection facility 802 may detect this condition (e.g., during a media content asset recovery component of the migration, detection facility 802 may detect ad slots (marked by cue tones in some examples) in the media content asset), and promotion management facility 804 may replace one or more stale advertisements with one or more new advertisements in the media content asset.

Figure 17:
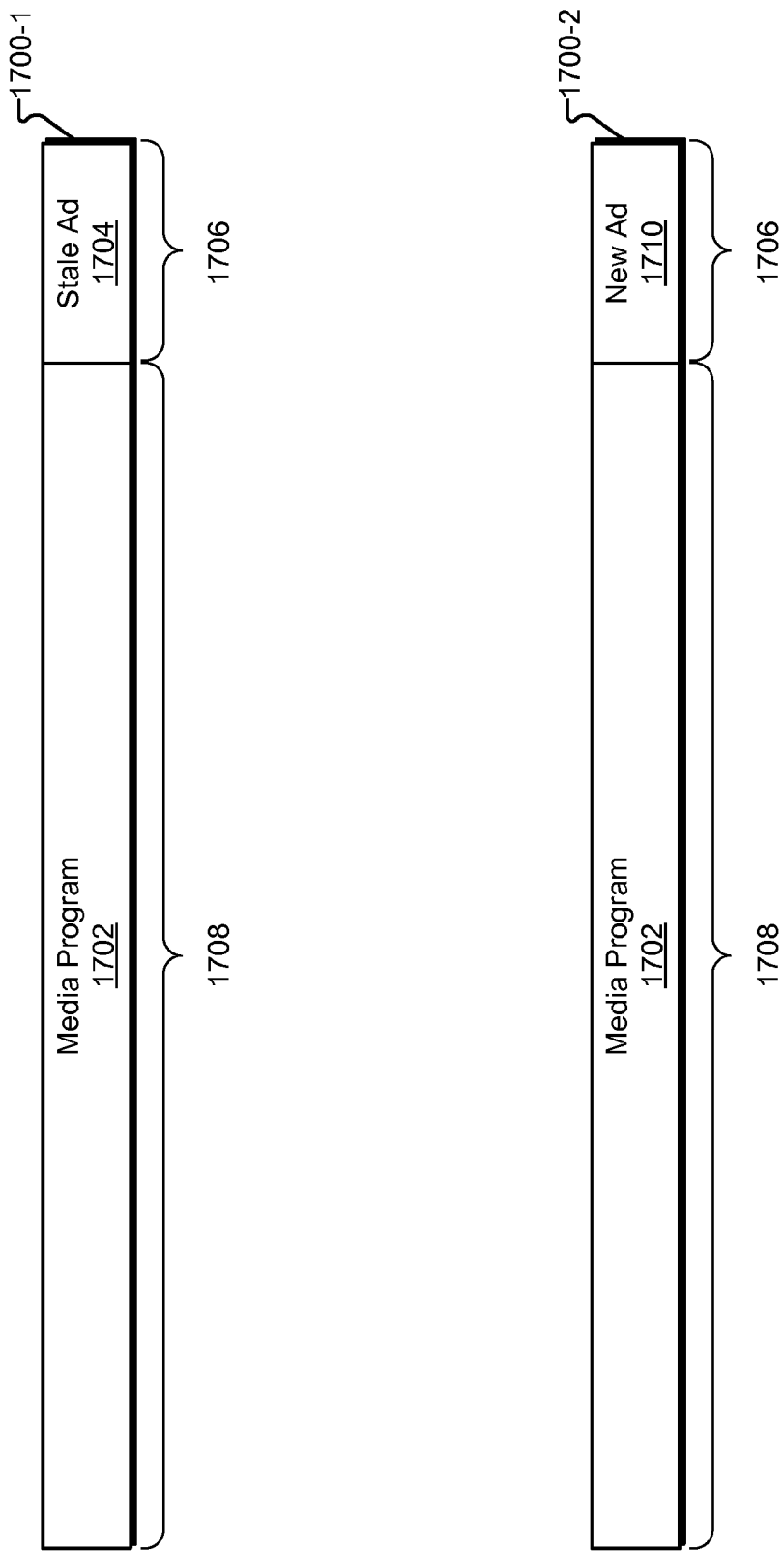
FIG. 17 illustrates an exemplary freshening of an advertisement included in a media content asset according to principles described herein.

To illustrate, FIG. 17 shows a media content asset 1700-1 that includes a media program 1702 and a stale advertisement 1704. In the illustrated example, the stale advertisement 1704 is included in an advertisement slot 1706 positioned in front of a program slot 1708 that includes the media program 1702 such that the stale advertisement 1704 will be played back before the media program 1702 is played back in a playback of the media content asset 1700-1. This positioning of the advertisement slot 1706 is illustrative only. A media content asset may include any number of advertisement slots at any positions within the media content asset.

In response to the detection that the media content asset 1700-1 contains the stale advertisement 1704, promotion management facility 804 may insert a new advertisement in the media content asset 1700-1. For example, promotion management facility 804 may replace the stale advertisement 1704 with a new advertisement 1710 in slot 1706 to form an updated media content asset 1700-2.

To illustrate, during a media content asset recovery component of the migration, a media content asset may be identified for acquisition. The media content asset may be determined to contain a stale advertisement, and promotion management facility 804 may replace the stale advertisement with a new advertisement such that an updated version of the media content asset including the new advertisement is acquired and stored by the second DVR system. Accordingly, when the media content asset is played back by the second DVR system, the new advertisement will be played back, thereby presenting promotional content to the user of the second DVR system based on a condition associated with the migration of the user account to the second DVR system.

A new advertisement may be associated with the media content asset at any suitable time, including before, during, and/or after acquisition of the media content asset by the second DVR system. Additionally or alternatively, the new advertisement may be associated with the media content asset in any suitable way, including by dynamically stitching the new advertisement to the media program to form the updated media content asset. The new advertisement may be stitched to the media program by appending the new advertisement to the front or end of the media program or by interstitially inserting the new advertisement within the media program.

In certain examples, the new advertisement may be associated with the media content asset by a service provider and/or a content provider, including any such providers mentioned herein. In certain examples, promotion management facility 804 may communicate with a computing system of a provider of the media program included in the media content asset to request new advertising content be associated with the media program by the content provider. In response, the computing system of the content provider may provide the second DVR system with an updated media content asset that includes the media program and new advertisement content.

Figure 18:
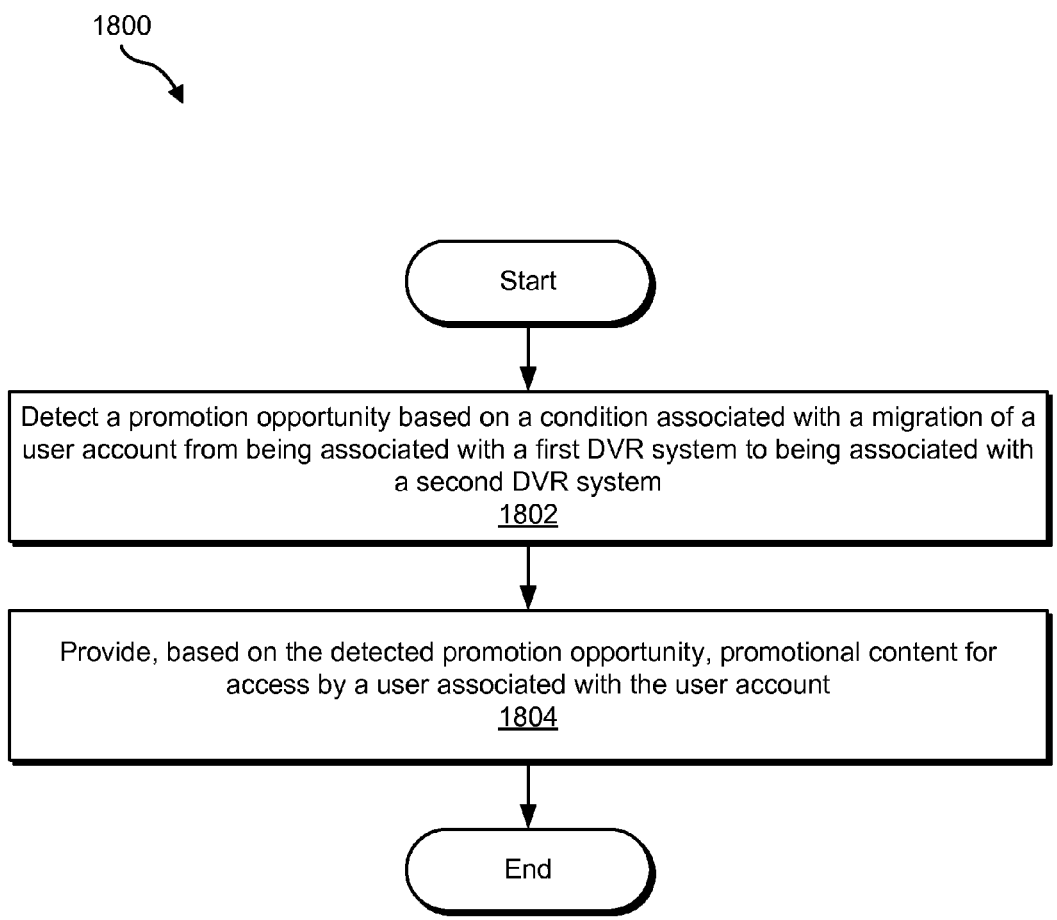
FIG. 18 illustrates an exemplary method of providing promotional content based on a migration of a user account from a first DVR system to a second DVR system according to principles described herein.

FIG. 18 illustrates an exemplary method 1800 of providing promotional content based on a migration of a user account from a first DVR system to a second DVR system. While FIG. 18 illustrates exemplary steps according to one embodiment, other embodiments may omit, add to, reorder, combine, and/or modify any of the steps shown in FIG. 18. One or more of the steps shown in FIG. 18 may be performed by promotion system 800 and/or any implementation thereof.

In step 1802, a promotion system detects a promotion opportunity based on a condition associated with a migration of a user account from being associated with a first DVR system to being associated with a second DVR system. Step 1802 may be performed in any of the ways described herein.

In step 1804, the promotion system provides, based on the detected promotion opportunity, promotional content for access by a user associated with the user account. In certain examples, step 1804 may be performed in response to the detecting in step 1802. In other examples, step 1804 may be performed not in response to the detecting in step 1802 but may still be based on the detected promotion opportunity and/or condition associated with the migration. Step 1804 may be performed in any of the ways described herein.

Figure 19:
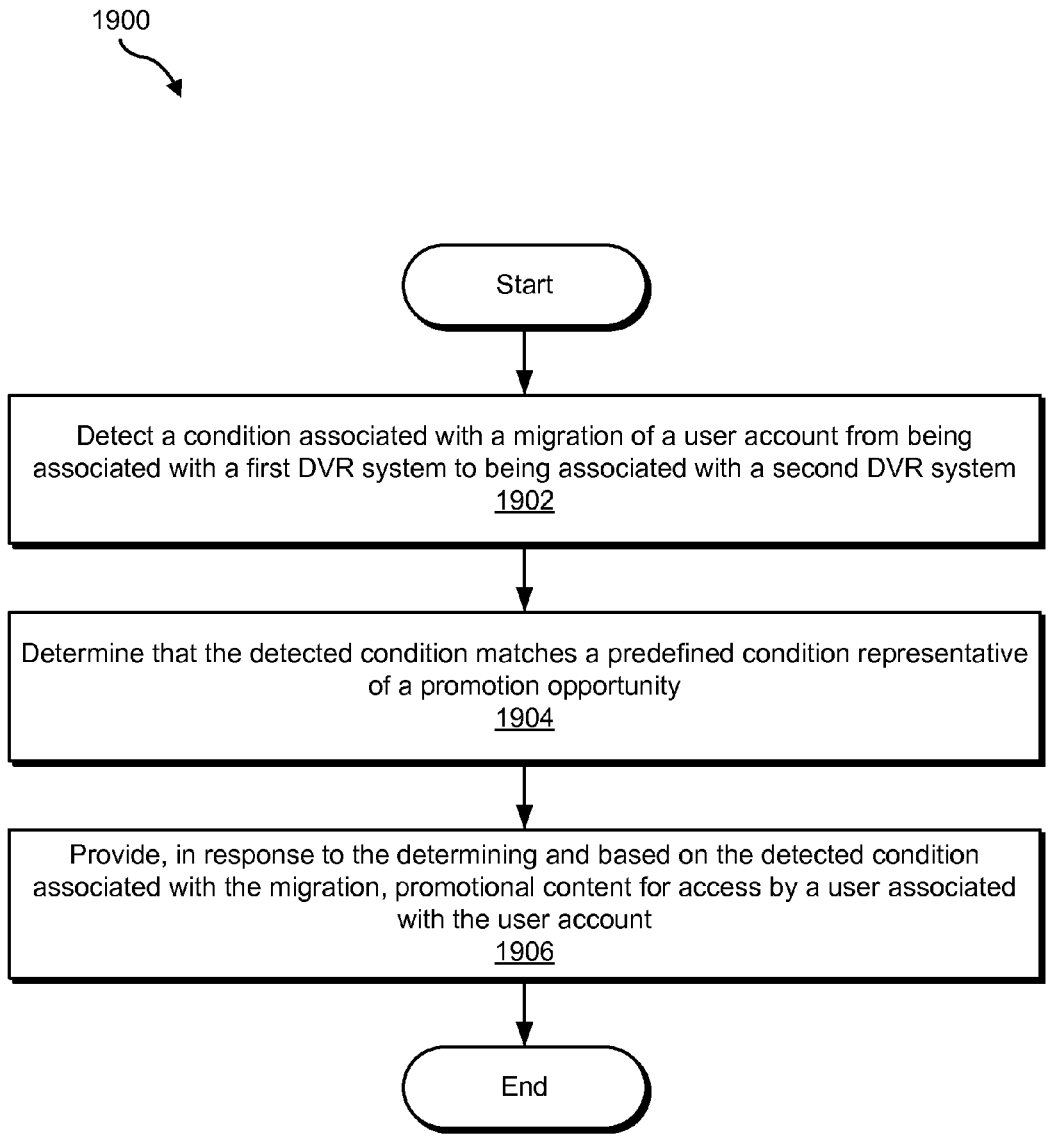
FIG. 19 illustrates another exemplary method of providing promotional content based on a migration of a user account from a first DVR system to a second DVR system according to principles described herein.

FIG. 19 illustrates an exemplary method 1900 of providing promotional content based on a migration of a user account from a first DVR system to a second DVR system. While FIG. 19 illustrates exemplary steps according to one embodiment, other embodiments may omit, add to, reorder, combine, and/or modify any of the steps shown in FIG. 19. One or more of the steps shown in FIG. 19 may be performed by promotion system 800 and/or any implementation thereof.

In step 1902, a promotion system detects a condition associated with a migration of a user account from being associated with a first DVR system to being associated with a second DVR system. Step 1902 may be performed in any of the ways described herein.

In step 1904, the promotion system determines that the detected condition matches a predefined condition representative of a promotion opportunity. Step 1904 may be performed in any of the ways described herein.

In step 1906, the promotion system provides, in response to the determining in step 1904 and based on the detected promotion opportunity, promotional content for access by a user associated with the user account. Step 1906 may be performed in any of the ways described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 20:
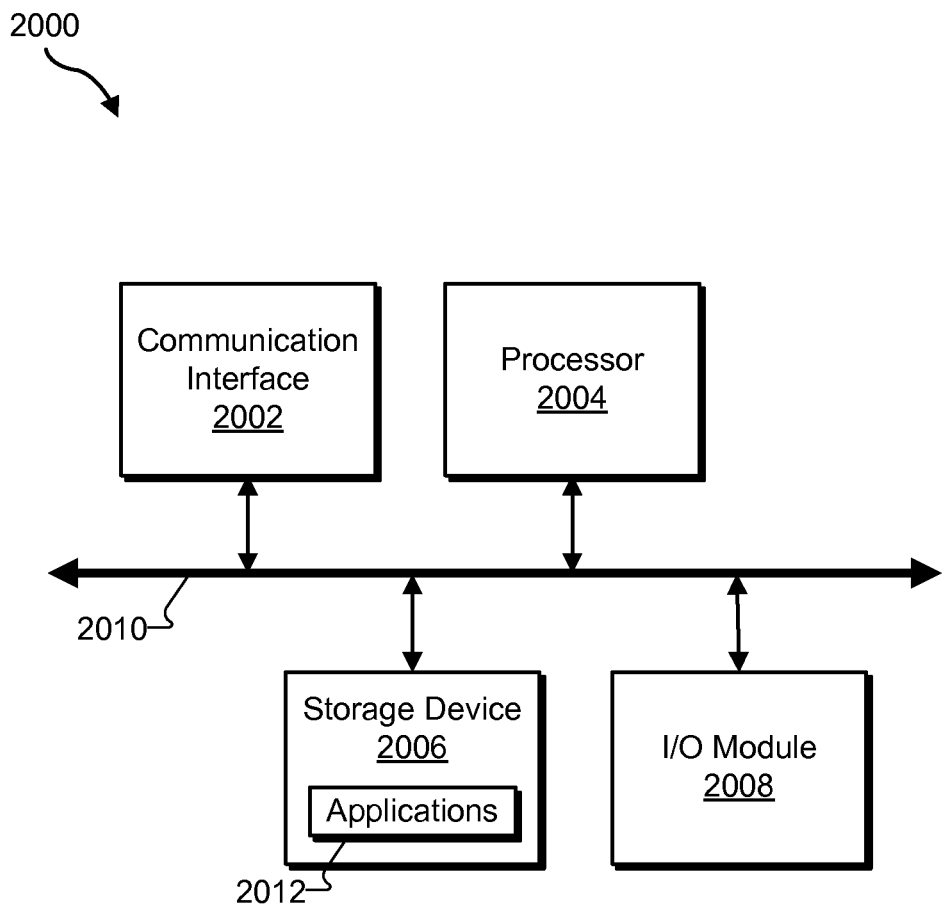
FIG. 20 illustrates an exemplary computing device according to principles described herein.

FIG. 20 illustrates an exemplary computing device 2000 that may be configured to perform one or more of the processes described herein. As shown in FIG. 20, computing device 2000 may include a communication interface 2002, a processor 2004, a storage device 2006, and an input/output ("I/O") module 2008 communicatively connected via a communication infrastructure 2010. While an exemplary computing device 2000 is shown in FIG. 20, the components illustrated in FIG. 20 are not intended to be limiting. Additional or alternative components may be used in other embodiments. Components of computing device 2000 shown in FIG. 20 will now be described in additional detail.

Communication interface 2002 may be configured to communicate with one or more computing devices. Examples of communication interface 2002 include, without limitation, a wired network interface (such as a network interface card), a wireless network interface (such as a wireless network interface card), a modem, an audio/video connection, and any other suitable interface.

Processor 2004 generally represents any type or form of processing unit capable of processing data or interpreting, executing, and/or directing execution of one or more of the instructions, processes, and/or operations described herein. Processor 2004 may direct execution of operations in accordance with one or more applications 2012 or other computer-executable instructions such as may be stored in storage device 2006 or another computer-readable medium.

Storage device 2006 may include one or more data storage media, devices, or configurations and may employ any type, form, and combination of data storage media and/or device. For example, storage device 2006 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 2006. For example, data representative of one or more executable applications 2012 configured to direct processor 2004 to perform any of the operations described herein may be stored within storage device 2006. In some examples, data may be arranged in one or more databases residing within storage device 2006.

I/O module 2008 may be configured to receive user input and provide user output and may include any hardware, firmware, software, or combination thereof supportive of input and output capabilities. For example, I/O module 2008 may include hardware and/or software for capturing user input, including, but not limited to, a keyboard or keypad, a touch screen component (e.g., touch screen display), a receiver (e.g., an RF or infrared receiver), and/or one or more input buttons.

I/O module 2008 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 2008 is configured to provide graphical data to a display for presentation to a user. The graphical data may be representative of one or more graphical user interfaces and/or any other graphical content as may serve a particular implementation.

In some examples, any of the systems and/or facilities described herein may be implemented by or within one or more components of computing device 2000. For example, one or more applications 2012 residing within storage device 2006 may be configured to direct processor 2004 to perform one or more processes or functions associated with data management facility 502, recovery facility 504, detection facility 802, and/or promotion management facility 804. Likewise, storage facility 506 and/or storage facility 806 may be implemented by or within storage device 2006.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   detecting, by a promotion system, a promotion opportunity based on a condition associated with a migration of a user account from being associated with a first digital video recording ("DVR") system to being associated with a second DVR system, the migration of the user account comprising a DVR data set porting component and a media content asset recovery component, the detecting of the promotion opportunity based on the condition associated with the migration occurring during at least one of the DVR data set porting component and the media content asset recovery component; and
   providing, by the promotion system based on the detected promotion opportunity, promotional content for access by a user associated with the user account.

2. The method of claim 1, wherein:
   the migration comprises a porting of metadata for a media content asset from the first DVR system to the second DVR system; and
   the condition indicates at least one of
     a lack of access by the second DVR system to the media content asset,
     an incomplete version of the media content asset is stored by the first DVR system,
     the media content asset is part of an incomplete set of media content assets stored by the first DVR system, and
     the media content asset includes a stale advertisement.

3. The method of claim 1, wherein the condition indicates an interest of the user in media content having a particular attribute.

4. The method of claim 1, wherein the DVR data set porting component is followed temporally by the media content asset recovery component.

5. The method of claim 1, wherein the detecting is performed in conjunction with the DVR data set porting component of the migration.

6. The method of claim 1, wherein the detecting is performed in conjunction with the media content asset recovery component of the migration.

7. The method of claim 1, wherein the condition associated with the migration comprises a porting condition associated with the DVR data set porting component of the migration.

8. The method of claim 1, wherein the condition associated with the migration comprises a recovery condition associated with the media content asset recovery component of the migration.

9. The method of claim 1, wherein the providing of the promotional content is performed in response to the detecting of the promotion opportunity.

10. The method of claim 1, wherein the providing of the promotional content comprises providing the promotional content for presentation in a user interface.

11. The method of claim 1, wherein:
the migration comprises a porting of metadata for a media content asset from the first DVR system to the second DVR system; and
the promotional content comprises at least one of
an indication of an availability of the media content asset for purchase,
an indication of an availability of an upgrade to a subscription package that provides access to the media content asset,
an indication of an availability of a higher quality version of the media content asset for purchase,
an indication of an availability of a complete media collection that includes the media content asset for purchase, and
an indication of an availability of an additional media content asset related to the media content asset.

12. The method of claim 1, wherein the providing of the promotional content comprises replacing a stale advertisement with a new advertisement in a media content asset associated with the migration.

13. The method of claim 1, wherein the providing of the promotional content comprises providing data representative of a recommendation of a media content asset not associated with the migration.

14. The method of claim 1, embodied as computer-executable instructions on at least one non-transitory computer-readable medium.

15. A method comprising:
detecting, by a promotion system, a condition associated with a migration of a user account from being associated with a first digital video recording ("DVR") system to being associated with a second DVR system, the migration of the user account comprising a DVR data set porting component and a media content asset recovery component, the detecting of the condition associated with the migration occurring during at least one of the DVR data set porting component and the media content asset recovery component;
determining, by the promotion system, that the detected condition matches a predefined condition representative of a promotion opportunity; and
providing, by the promotion system in response to the determining and based on the detected condition associated with the migration, promotional content for access by a user associated with the user account.

16. The method of claim 15, wherein:
the condition indicates a lack of access by the second DVR system to a media content asset associated with the migration; and
the promotional content comprises one of
an option configured to be selected by the user to facilitate a purchase of the media content asset, and
an option configured to be selected by the user to facilitate an upgrade to a subscription package that provides access to the media content asset.

17. The method of claim 15, wherein:
the condition indicates an availability to the second DVR system of a higher quality version of a media content asset associated with the migration; and
the promotional content comprises an option configured to be selected by the user to facilitate a purchase of the higher quality version of the media content asset.

18. The method of claim 15, wherein:
the condition indicates an incomplete version of a media content asset associated with the migration; and
the promotional content comprises an option configured to be selected by the user to facilitate a purchase of a complete version of the media content asset.

19. The method of claim 15, wherein:
the condition indicates that an incomplete set of media content assets is associated with the migration; and
the promotional content comprises an option configured to be selected by the user to complete the incomplete set of media content assets.

20. The method of claim 15, wherein:
the condition indicates an interest of a user in a media content asset having a particular attribute; and
the promotional content comprises an option configured to be selected by the user to access another media content asset that has the same particular attribute.

21. The method of claim 15, embodied as computer-executable instructions on at least one non-transitory computer-readable medium.

22. A system comprising:
at least one computing device implementing:
a detection facility configured to detect a promotion opportunity based on a condition associated with a migration of a user account from being associated with a first digital video recording ("DVR") system to being associated with a second DVR system, the migration of the user account comprising a DVR data set porting component and a media content asset recovery component, the detecting of the condition associated with the migration occurring during at least one of the DVR data set porting component and the media content asset recovery component; and
a promotion management facility communicatively coupled to the detection facility and configured to provide, based on the detected promotion opportunity, promotional content for access by a user associated with the user account.

* * * * *